(12) United States Patent
Ueda et al.

(10) Patent No.: US 7,504,786 B2
(45) Date of Patent: Mar. 17, 2009

(54) MOTOR CONTROLLER

(75) Inventors: Takeshi Ueda, Kashiba (JP); Shigeki Nagase, Nabari (JP)

(73) Assignee: JTEKT Corporation, Osaka (JP)

( * ) Notice: Subject to any disclaimer, the term of this patent is extended or adjusted under 35 U.S.C. 154(b) by 230 days.

(21) Appl. No.: 11/702,928

(22) Filed: Feb. 5, 2007

(65) Prior Publication Data

US 2007/0182355 A1 Aug. 9, 2007

(30) Foreign Application Priority Data

Feb. 8, 2006 (JP) ............................. 2006-031462

(51) Int. Cl.
*H02P 1/00* (2006.01)
(52) U.S. Cl. .................... 318/139; 318/599; 318/254.1; 180/466
(58) Field of Classification Search ................ 318/139, 318/254.1, 434, 437, 439, 599, 661; 180/446
See application file for complete search history.

(56) References Cited

U.S. PATENT DOCUMENTS

| | | | | |
|---|---|---|---|---|
| 4,879,502 A * | 11/1989 | Endo et al. | ................... | 318/723 |
| 6,690,135 B2 * | 2/2004 | Mir et al. | .................... | 318/599 |
| 6,696,812 B2 * | 2/2004 | Kaneko et al. | .............. | 318/700 |
| 6,798,161 B2 * | 9/2004 | Suzuki | ........................ | 318/434 |
| 6,883,637 B2 * | 4/2005 | Nishizaki et al. | ............. | 180/446 |
| 7,126,304 B2 * | 10/2006 | Suzuki | ................... | 318/400.04 |
| 7,199,538 B2 * | 4/2007 | Kameya | ................. | 318/400.05 |
| 7,342,366 B2 * | 3/2008 | Ueda et al. | ............... | 318/254.1 |
| 2005/0093505 A1 | 5/2005 | Kameya | | |
| 2006/0113937 A1 * | 6/2006 | Hidaka et al. | ................ | 318/432 |

FOREIGN PATENT DOCUMENTS

| | | |
|---|---|---|
| EP | 1 359 663 | 11/2003 |
| EP | 1 523 061 | 4/2005 |
| JP | 2001-268980 | 9/2001 |
| WO | WO- 03/105329 | 12/2003 |

* cited by examiner

*Primary Examiner*—Bentsu Ro
*Assistant Examiner*—Thai Dinh
(74) *Attorney, Agent, or Firm*—Jordan and Hamburg LLP

(57) ABSTRACT

A motor controller judges whether or not a duty cycle of a PWM control signal, which is used to open and close a switching element on a power supply line to a motor, is in a current detection permission region. When the duty cycle is in the current detection permission region, an impedance is determined in time series via a calculation based on a predetermined relationship between a current, a terminal voltage, a speed electromotive force, and an impedance of a coil constituting an armature winding, and the output of the motor is controlled so as to reduce the deviation between a current target value and a value corresponding to a detected current. When the duty cycle is not in the current detection permission region, the output of the motor is controlled so as to reduce the deviation between the current target value and a value corresponding to a current determined via a calculation based on the latest determined impedance.

8 Claims, 14 Drawing Sheets

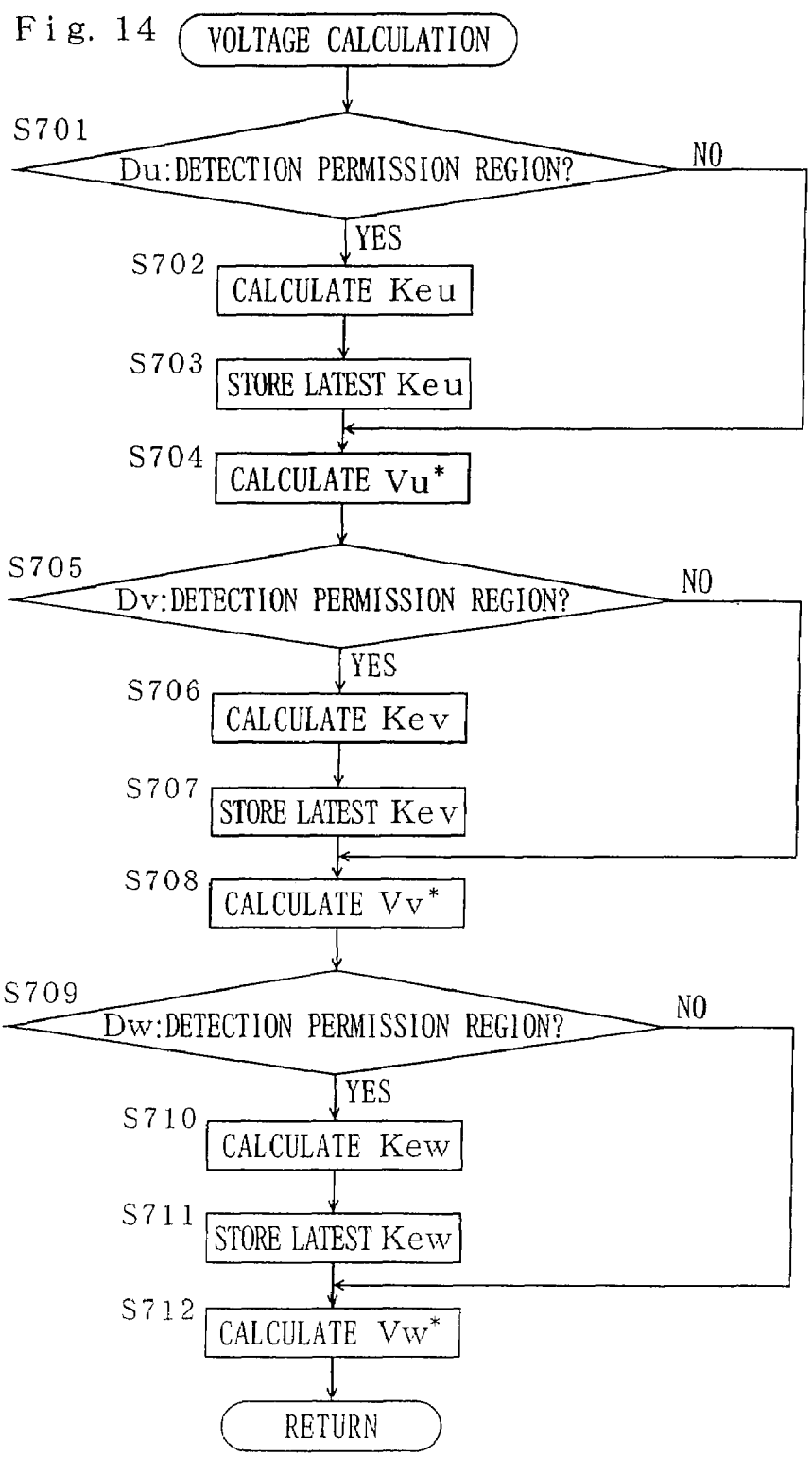

MOTOR CONTROLLER

BACKGROUND OF THE INVENTION

The present invention relates to a motor controller for opening and closing a switching element arranged on a power supply line to a motor by a PWM control signal, for controlling the output of the motor utilized, for example, for generating steering assist power in an electric power steering apparatus.

In a motor controller, which performs a feedback control of the motor output in accordance with the armature current flowing through a coil constituting the armature winding of the motor, the current flowing through a current detection resistor arranged in a motor drive inverter circuit is detected as the armature current. Applied voltage to the coil constituting the armature is changed to control the motor output by opening and closing operation the switching element, which constitutes the inverter circuit, in accordance with the PWM control signal having a duty cycle corresponding to a deviation between a target current and the detected current.

When the opening and closing operation of the switching element is performed by the PWM control signal, optimal current detection is not always possible due to the existence of a period of time during which the current does not flow into the current detection resistor. For this reason, the duty cycle of the PWM control signal corresponding to the applied voltage to the coil must be restricted, causing the availability of voltage of the power supply source to drop and impeding the improvement of motor performance.

Accordingly, a method for calculating the armature current based on the speed electromotive force, the drive voltage, the winding resistance, and the inductance of the motor without using any current detection resistor has been proposed (Japanese Laid-open Patent No. 2001-268980).

SUMMARY OF THE INVENTION

In the above-mentioned prior art, the winding resistance, the inductance, and the speed electromotive force of the motor are treated as constants. However, the winding resistance, the inductance, and the speed electromotive force of the motor actually change with the lapse of time in accordance with the state of the motor, such as the coil temperature, rotational speed, and armature current. For this reason, the armature current cannot be accurately determined and the motor performance cannot be fully enhanced. The object of the present invention is to solve the above problem and provide a motor controller which can be used not only for the feedback control but also for the open-loop control of the motor.

The present invention applies to a motor controller, which controls the output of the motor by opening and closing a switching element arranged on the power supply line to the motor in accordance with a PWM control signal.

A motor controller of the present invention comprises a relation storage part for storing predetermined relationships between a current, a terminal voltage, a speed electromotive force, and an impedance of a coil constituting an armature winding of the motor; a voltage determination part for determining the terminal voltage of the coil; a current detector for detecting the current of the coil; and a judgment part for judging whether or not a duty cycle of the PWM control signal is in a current detection permission region by comparing the PWM control signal with a set reference value.

The first characteristic aspect of the present invention is that the motor controller comprises a speed electromotive force determination part for determining the speed electromotive force of the coil; an impedance calculation part for determining the impedance of the coil in time series via a calculation based on the stored relationship, the determined terminal voltage, the determined speed electromotive force, and the detected current when the duty cycle of the PWM control signal is in the current detection permission region; a latest impedance storage part for storing the latest impedance determined by the impedance calculation part; a current calculation part for determining the current of the coil via a calculation based on the stored relationship, the determined terminal voltage, the determined speed electromotive force, and the stored latest impedance; and a current target value calculation part for determining a current target value via a calculation, and that when the duty cycle of the PWM control signal is in the current detection permission region, the output of the motor is controlled so as to reduce the deviation between the current target value determined by the current target value calculation part and a value corresponding to the detected current, and when the duty cycle of the PWM control signal is not in the current detection permission region, the output of the motor is controlled so as to reduce the deviation between the current target value determined by the current target value calculation part and a value corresponding to the current determined by the current calculation part.

Thus, when the duty cycle of the PWM control signal is in the current detection permission region, the motor output is subjected to a feedback control so as to reduce the deviation between the current target value and the value corresponding to the detected current, and when the duty cycle of the PWM control signal is not in the current detection permission region, the motor output is subjected to a feedback control so as to reduce the deviation between the current target value and the value corresponding to the current determined by the current calculation part. Accordingly, since the feedback control of the motor output can be performed regardless of the duty cycle of the PWM control signal, so that the duty cycle corresponding to the applied voltage to the coil need not to be restricted, making it possible to improve the availability of voltage.

Furthermore, the current calculation part determines the current based on the latest impedance determined via a calculation. Accordingly, even if the impedance changes with the lapse of time in accordance with the state of the motor, the current can be determined accurately, making it possible to improve the motor performance.

The second characteristic aspect of the present invention is that the motor controller comprises a set impedance storage part for storing a set impedance of the coil; a rotational speed determination part for determining the rotational speed of the motor; a unit speed electromotive force calculation part for determining a unit speed electromotive force, which is a speed electromotive force per unit rotational speed of the motor, in time series via a calculation based on the stored relationship, determined terminal voltage, stored impedance, determined rotational speed, and detected current, when the duty cycle of the PWM control signal is in the current detection permission region; a latest unit speed electromotive force storage part for storing the latest unit speed electromotive force determined by the unit speed electromotive force calculation part; a current calculation part for determining the current of the coil via a calculation based on the stored relationship, the determined terminal voltage, the stored impedance, the determined rotational speed, and the stored latest unit speed electromotive force; and a current target value calculation part for determining a current target value via a calculation, and that when the duty cycle of the PWM control signal is in the current detection permission region, the output of the motor is controlled so as to reduce the deviation between the current target value determined by the current target value calculation part and a value corresponding to the detected current, and when the duty cycle of the PWM control signal is not in the current detection permission region, the output of the motor is controlled so as to reduce the deviation between the current target value determined by the current target value calculation part and a value corresponding to the current determined by the current calculation part.

Thus, when the duty cycle of the PWM control signal is in the current detection permission region, a feedback control of the motor output can be performed so as to reduce the deviation between the current target value and the value corresponding to the detected current, and when the duty cycle of the PWM control signal is not in the current detection permission region, a feedback control of the motor output can be performed so as to reduce the deviation between the current target value and the value corresponding to the current determined by the current calculation part. Accordingly, since the feedback control of the motor output can be performed regardless of the duty cycle of the PWM control signal, the duty cycle corresponding to the applied voltage to the coil need not to be restricted, making it possible to improve the availability of voltage.

Furthermore, the current calculation part determines the current based on the speed electromotive force, which is a product of the determined rotational speed and the latest unit speed electromotive force determined via a calculation. Accordingly, even if the unit speed electromotive force changes with the lapse of time in accordance with the state of the motor, the current can be determined accurately and the motor performance can be improved.

The third characteristic aspect of the present invention is that the motor controller comprises a speed electromotive force determination part for determining the speed electromotive force of the coil; an impedance calculation part for determining the impedance of the coil in time series via a calculation based on the stored relationship, the determined terminal voltage, the determined speed electromotive force, and the detected current, when the duty cycle of the PWM control signal is in the current detection permission region; a latest impedance storage part for storing the latest impedance determined by the impedance calculation part; a current target value calculation part for determining a current target value via a calculation; and a voltage calculation part for determining a target applied voltage via a calculation based on the stored relationship, the determined current target value, the determined speed electromotive force, and the determined latest impedance, on the assumption that the current target value corresponds to the current of the coil and the target applied voltage correspond to the terminal voltage of the coil, and that the output of the motor is controlled such that the target applied voltage determined by the voltage calculation part is applied to the coil.

Thus, the target applied voltage for performing an open loop control of the motor output can be determined based on the latest impedance determined at the time when the duty cycle of the PWM control signal is in the current detection permission region, whether the duty cycle of the PWM control signal is in or not in the current detection permission region. Accordingly, since the target applied voltage for performing the open-loop control of the motor output can be determined regardless of the duty cycle of the PWM control signal, the duty cycle corresponding to the applied voltage to the coil need not to be restricted, making it possible to improve the availability of voltage.

Furthermore, the target applied voltage is determined based on the latest impedance determined via a calculation. Accordingly, even if the impedance changes with the lapse of time in accordance with the state of the motor, the target applied voltage can be accurately determined, making it possible to enhance motor performance.

The fourth characteristic aspect of the present invention is that the motor controller comprises a set impedance storage part for storing a set impedance of the coil; a rotational speed determination part for determining the rotational speed of the motor; a unit speed electromotive force calculation part for determining a unit speed electromotive force, which is a speed electromotive force per unit of rotational speed of the motor, in time series via a calculation based on the stored relationship, the determined terminal voltage, the stored impedance, the determined rotational speed, and the detected current when the duty cycle of the PWM control signal is in the current detection permission region; a latest unit speed electromotive force storage part for storing the latest unit speed electromotive force determined by the unit speed electromotive force calculation part; a current target value calculation part for determining a current target value via a calculation; and a voltage calculation part for determining a target applied voltage to the coil via a calculation based on the stored relationship, the determined current target value, the stored impedance, the determined rotational speed, and the determined latest unit speed electromotive force, on the assumption that the current target value corresponds to the current of the coil and the target applied voltage corresponds to the terminal voltage of the coil, and that the output of the motor is controlled such that the target applied voltage determined by the voltage calculation part is applied to the coil.

Thus, the target applied voltage for performing an open loop control of the motor output can be determined based on the speed electromotive force, which is a product of the determined rotational speed and the latest unit speed electromotive force determined at the time when the duty cycle of the PWM control signal is in the current detection permission region, whether the duty cycle of the PWM control signal is in or not in the current detection permission region. Accordingly, since the target applied voltage for performing the open-loop control of the motor output can be determined regardless of the duty cycle of the PWM control signal, the duty cycle corresponding to the applied voltage to the coil need not to be restricted, making it possible to improve the availability of voltage.

Furthermore, the target applied voltage is determined based on and the speed electromotive force which is the product of the determined rotational speed the latest unit speed electromotive force determined via a calculation. Accordingly, even if the unit speed electromotive force changes with the lapse of time in accordance with the state of the motor, the target applied voltage can be accurately determined, making it possible to enhance motor performance.

It is preferable that the motor is a three-phase brushless motor, which is feedback controlled in accordance with the respective phase currents of three-phase coils constituting the armature winding of the motor, and a relationship expressed by the following equations (1) through (3) is stored as the predetermined relationship between the current, the terminal voltage, the speed electromotive force, and the impedance of the coil:

$$Iu=(Vu-Eu)/Zu \quad (1)$$

$$Iv=(Vv-Ev)/Zv \quad (2)$$

$$Iw=(Vw-Ew)/Zw \quad (3)$$

where Iu, Iv, Iw are phase currents of the respective three-phase coils, Vu, Vv, Vw are terminal voltages of the respective three-phase coils, Eu, Ev, Ew are speed electromotive forces of the respective three-phase coils, and Zu, Zv, Zw are impedances of the respective three-phase coil, and the speed electromotive force is determined by multiplying the unit speed electromotive force by the rotational speed of the motor.

Thus, when the feedback control of the motor output is performed, the impedance Zu or the unit speed electromotive force of the U-phase coil is calculated with using the equation (1) based on the detected phase current Iu flowing through the U-phase coil when the duty cycle of the PWM control signal for the U-phase is in the current detection permission region, and then the phase current Iu can be determined via a calculation with using the equation (1) based on the calculated impedance Zu or the calculated unit speed electromotive force when the duty cycle of the PWM control signal for the U-phase is not in the current detection permission region. Similarly, the impedance Zv or the unit speed electromotive force of the V-phase coil is calculated with using the equation (2) based on the detected phase current Iv flowing through the V-phase coil, and then the phase current Iv can be determined via a calculation with using the equation (2) based on the calculated impedance Zv or the calculated unit speed electromotive force when the duty cycle of the PWM control signal for the V-phase is not in the current detection permission region. Further, the impedance Zw or the unit speed electromotive force of the W-phase coil is calculated with using the equation (3) based on the detected phase current Iw flowing through the W-phase coil, and then the phase current Iw can be determined via a calculation with using the equation (3) based on the calculated impedance Zw or the calculated unit speed electromotive force when the duty cycle of the PWM control signal for the W-phase is not in the current detection permission region.

Further, in the respective equations, the phase currents Iu, Iv, Iw correspond to the current target values, and the terminal voltages Vu, Vv, Vw correspond to the target applied voltages, when the open-loop control of the motor output is performed. In this case, when the duty cycle of the PWM control signal for the U-phase is in the current detection permission region, the impedance Zu or the unit speed electromotive force of the U-phase coil is calculated with using the equation (1) based on the detected phase current Iu flowing through the U-phase coil, and then the current target value of the U-phase coil can be calculated with using the equation (1) based on the latest calculated impedance Zu or the latest calculated unit speed electromotive force whether the duty cycle of the PWM control signal for the U-phase is in the current detection permission region or not. Similarly, when the duty cycle of the PWM control signal for the V-phase is in the current detection permission region, the impedance Zv or the unit speed electromotive force of the V-phase coil is calculated with using the equation (2) based on the detected phase current Iv flowing through the V-phase coil, and then the current target value of the V-phase coil can be calculated with using the equation (2) based on the latest calculated impedance Zv or the latest calculated unit speed electromotive force whether the duty cycle of the PWM control signal for the V-phase is in the current detection permission region or not. Further, when the duty cycle of the PWM control signal for the W-phase is in the current detection permission region, the impedance Zw or the unit speed electromotive force of the W-phase coil is calculated with using the equation (3) based on the detected phase current Iw flowing through the W-phase coil, and then the current target value of the W-phase coil can be calculated with using the equation (3) based on the latest calculated impedance Zw or the latest calculated unit speed electromotive force whether the duty cycle of the PWM control signal for the W-phase is in the current detection permission region or not.

Accordingly even if the impedance and the unit speed electromotive force change with the lapse of time in accordance with the state of the motor, the feedback current or the target applied voltage can be accurately determined and the motor performance can be improved.

According to the motor controller of the present invention, there is no need for restricting the duty cycle of the PWM control signal in the detection of current, thereby making it possible to improve the availability of voltage and enhance motor performance.

BRIEF DESCRIPTION OF THE DRAWINGS

FIG. 14 is a flowchart showing control procedures by the motor controller of the fifth embodiment of the present invention.

DETAILED DESCRIPTION OF THE INVENTION

Figure 1:
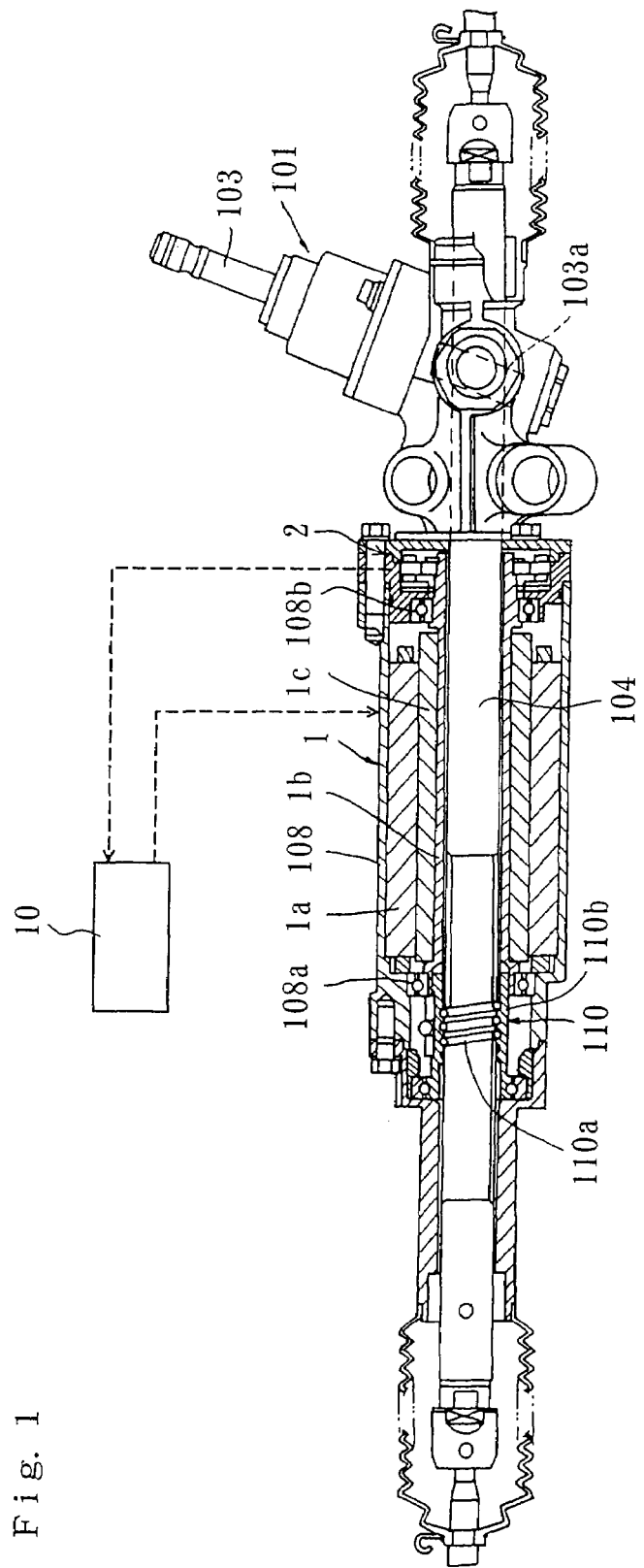
FIG. 1 is a partially broken front view of an electric power steering apparatus of an embodiment of the present invention.

A vehicular rack-and-pinion type electric power steering apparatus 101 of the first embodiment shown in FIG. 1 comprises a steering shaft 103 which rotates by steering operation, a pinion 103a provided on the steering shaft 103, a rack 104 which meshes with the pinion 103a, a three-phase brushless motor 1 for generating steering assist power, and a screw mechanism 110 for transmitting the output of the motor 1 to the rack 104. Each end of the rack 104 is connected to a wheel for steering (omitted from figure). The rack 104 is moved along the lateral direction of the vehicle by the rotation of the pinion 103a due to the steering operation, and the steering angle changes in accordance with the movement of this rack 104.

The motor 1 comprises a stator 1a fixed to a housing 108 that covers the rack 104, a tubular rotor 1b rotationally supported by the housing 108 via bearings 108a, 108b, and a magnet 1c fitted to the rotor 1b. The stator 1a comprises three-phase coils constituting the armature winding of the motor 1. In this embodiment, the three-phase coils comprise a U-phase coil, a V-phase coil, and a W-phase coil. The rotor 1b surrounds the rack 104. A rotational position detector for detecting the rotational position of the rotor 1b is constituted of a resolver 2.

The screw mechanism 110 comprises a ball screw shaft 110a integrally formed on the outer periphery of the rack 104, and a ball nut 110b screwed to the ball screw shaft 110a via balls. The ball nut 110b is connected to the rotor 1b. Thus, steering assist power along the longitudinal direction of the rack 104 is provided by rotating the ball nut 110b by means of the motor 1. The motor 1 is connected to a motor controller 10.

Figure 2:
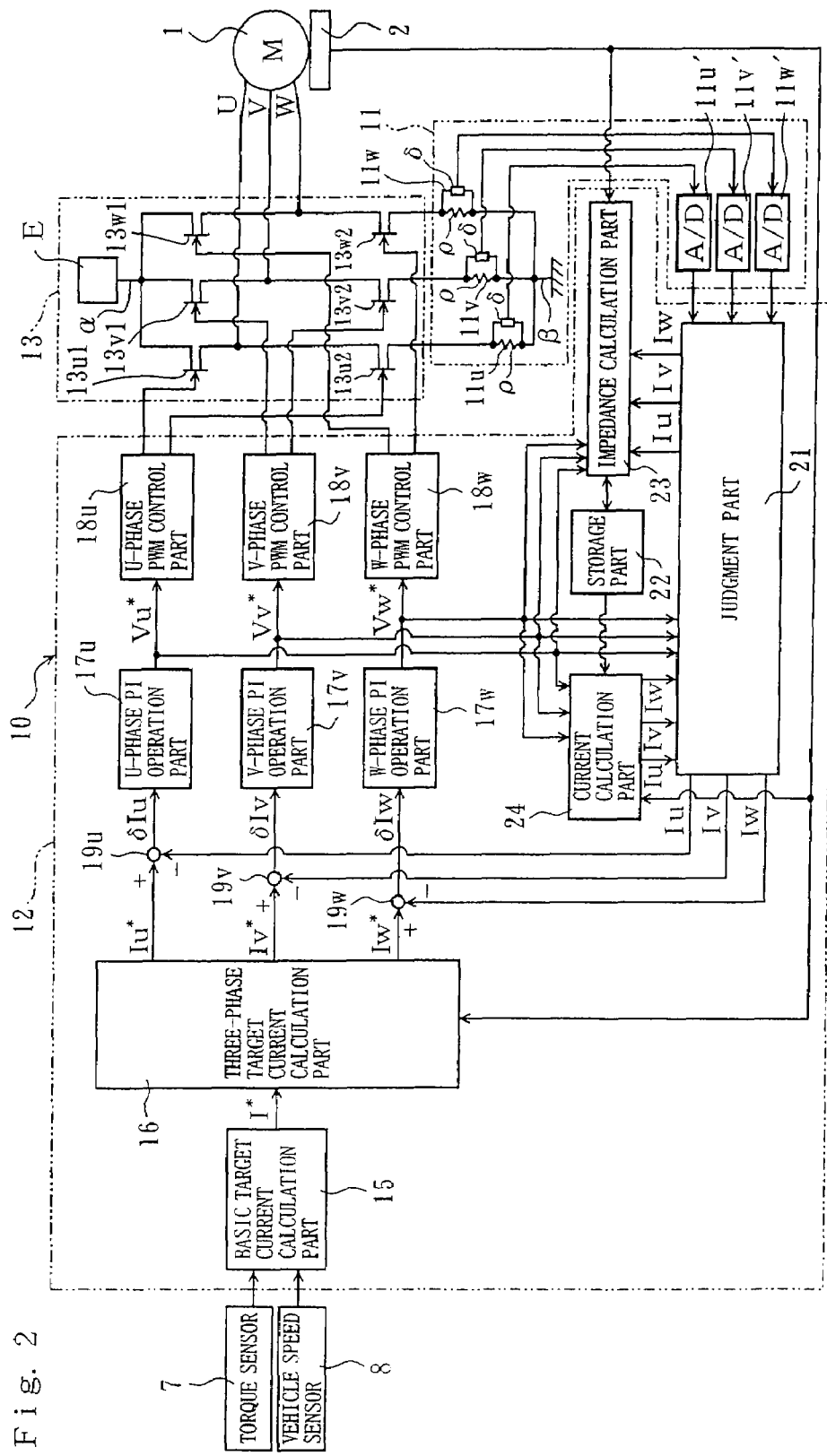
FIG. 2 illustrates the constitution of a motor controller of the first embodiment of the present invention.

FIG. 2 shows a functional block diagram of the controller 10. The controller 10 comprises a current detector 11, a signal processor 12, and a driver 13. The resolver 2, a torque sensor 7 for detecting the steering torque transmitted by the steering shaft 103, and a vehicle speed sensor 8 for detecting vehicle speed are connected to the controller 10.

The current detector 11, which detects the respective phase currents of the three-phase coils in time series, has current detecting parts 11u, 11v, 11w and A/D converters 11u', 11v', 11w' which perform A/D conversion of current detection signals outputted by the current detecting parts 11u, 11v, 11w.

The signal processor 12 is constituted of, for example, a microcomputer, and has a basic target current calculation part 15, a three-phase target current calculation part 16, PI (proportional integral) calculation parts 17u, 17v, 17w corresponding to the three-phase coils, PWM (pulse width modulation) control parts 18u, 18v, 18w corresponding to the three-phase coils, deviation calculation parts 19u, 19v, 19w corresponding to the three-phase coils, a judgment part 21, a storage part 22, an impedance calculation part 23, and a current calculation part 24. In this embodiment, the basic target current calculation part 15 and three-phase target current calculation part 16 constitute a current target value calculation part, and the storage part 22 constitutes a relation storage part and a latest impedance storage part.

The driver 13 has a pair of U-phase FETs 13u1, 13u2, a pair of V-phase FETs 13v1, 13v2, and a pair of W-phase FETs 13w1, 13w2 as switching elements arranged on the power supply line to the motor 1 to constitute an inverter circuit. Each of the current detectors 11u, 11v, 11w has a current detection resistor ρ and a detection circuit δ. Each of the current detection resistor ρ is arranged between the earth terminal and each of the lower arm FETs 13u2, 13v2, 13w2. Each of the detection circuit δ amplifies the current flowing through the current detection resistor ρ to output the current detection signal.

The basic target current calculation part 15 calculates the basic target current I* of the motor 1 based on the steering torque detected by the torque sensor 7 and the vehicle speed detected by the vehicle speed sensor 8. The calculation of the basic target current I* can be performed with using a known method, for example, the basic target current I* becomes larger as the steering torque becomes larger and the vehicle speed becomes lower.

The three-phase target current calculation part 16 calculates the target phase currents Iu*, Iv*, Iw* of the three-phase coils based on the basic target current I* and the rotation position of the rotor 1b detected by the resolver 2. The calculation in the three-phase target current calculation part 16 can be performed with using a known method. In this embodiment, the target phase currents Iu*, Iv*, Iw* are treated as the current target values.

The deviation calculation parts 19u, 19v, 19w respectively calculate the deviation 61u between the target phase current Iu* of the U-phase coil and the phase current Iu outputted from the judgment part 21, the deviation 61v between the target phase current Iv* of the V-phase coil and the phase current Iv outputted from the judgment part 21, and the deviation 61w between the target phase current Iw* of the W-phase coil and the phase current Iw outputted from the judgment part 21. In this embodiment, the phase currents Iu, Iv, Iw are treated as values corresponding to the detected currents or the values corresponding to the currents determined by the current calculation part 24.

The PI calculation parts 17u, 17v, 17w respectively calculate the target applied voltage Vu* to the U-phase coil, the target applied voltage Vv* to the V-phase coil, and the target applied voltage Vw* to the W-phase coil by performing PI calculations on the deviations 61u, 61v, 61w calculated by the deviation calculation parts 19u, 19v, 19w.

The PWM control parts 18u, 18v, 18w form PWM control signals, which are pulse signals having duty cycles corresponding to the respective target applied voltages Vu*, Vv*, Vw* calculated by the PI calculation parts 17u, 17v, 17w.

The respective FETs 13u1, 13u2, 13v1, 13v2, 13w1, 13w2 of the driver 13 are opened and closed by the PWM control signals such that the voltages applied to the coils from the battery E become the target applied voltages Vu*, Vv*, VW* in the respective phases.

To be more precise, in the U-phase of the inverter circuit, when the PWM control signal inputted to the gate of one of the upper arm FET 13u1 and the lower arm FET 13u2 is high pulse, the PWM control signal inputted to the gate of the other is low pulse, and dead time is set between the falling edge of one of the PWM control signals and the rising edge of the other. The same holds true for the V-phase and the W-phase.

The duty cycles of the PWM control signals inputted to the gates of the upper arm FETs 13u1, 13v1, 13w1 of the respective phases are treated as 0.5 when the target applied voltages Vu*, Vv*, VW* are 0, as 1 when the target applied voltages Vu*, Vv*, Vw* are the maximum values for rotating the motor 1, and as 0 when the target applied voltages Vu*, Vv*, Vw* are the minimum values for rotating the motor 1, with disregarding the dead time.

Thus, the output of the motor 1 is feedback controlled in accordance with the respective phase currents Iu, Iv, Iw of the three-phase coils by opening and closing the switching element arranged on the power supply line to the motor 1 for supplying power in accordance with PWM control signals.

The judgment part 21 judges whether or not the respective duty cycles of the PWM control signals inputted to the gates of the lower arm FETs 13u2, 13v2, 13w2 of the respective phases are in the current detection permission region. This judgment is performed by comparing the duty cycles corresponding to the target applied voltages Vu*, Vv*, Vw* calculated in the PI calculation parts 17u, 17v, 17w with a predetermined reference value. To be more precise, in each phase, the flow of current to the current detection resistor ρ is stopped when the duty cycle is 0, and reliable current detection is not possible even when it is near 0. Accordingly, in this embodiment, the duty cycle is determined to be in the current detection permission region when it exceeds the reference value, and the duty cycle is determined not to be in the current detection permission region when it is equal to or less than the reference value. The concrete value of the reference value is equal to or greater than the lower limit capable of ensuring a reliable detected current value, and can be predetermined in accordance with experiments. The judgment part 21 sends the phase currents Iu, Iv, Iw detected at the time when the duty cycles of the PWM control signals are in the current detection permission region to the impedance calculation part 23.

Furthermore, in each phase, when the duty cycle of the PWM control signal inputted to the gate of each of the upper arm FETs 13u1, 13v1, 13w1 is 1, the flow of current to the current detection resistor ρ is stopped, and reliable current detection is not possible even when it is near 1. Accordingly, as a variation, the duty cycle can be determined to be in the current detection permission region when it is less than a reference value, and the duty cycle can be determined not to be in the current detection permission region when it is equal to or greater than the reference value. In this case, the concrete value of the reference value is equal to or less than the upper limit capable of ensuring a reliable detected current value, and can be predetermined in accordance with experiments.

Further, in each phase, the arrangement of the current detection resistor ρ that constitutes the current detector is not particularly limited as long as the current flowing through the coil constituting the armature winding of the motor 1 can be detected. For example, the current detection resistor ρ for each of the respective phases U, V, W can be arranged in the upstream position of each of the upper arm FETs 13u1, 13v1, 13w1. When it is arranged in the upstream position, the duty cycle of the PWM control signal inputted to the gate of each of the upper arm FETs 13u1, 13v1, 13w1 can be determined to be in the current detection permission region when it exceeds the reference value, and the duty cycle is determined not to be in the current detection permission region if the duty cycle is equal to or less than the reference value.

Furthermore, instead of providing three current detection parts 11u, 11v, 11w corresponding to the respective three-phase coils as in the above-mentioned embodiment, a single current detection resistor ρ can be arranged in either position α or position β in FIG. 2 so as to determine the currents flowing through the respective three-phase coils based on the current detected in that position and the timing of the opening and closing of the FETs 13u1, 13u2, 13v1, 13v2, 13w1, 13w2.

The storage part 22 stores the relationships expressed in the above-mentioned equations (1) through (3) as predetermined relationships between the phase currents, terminal voltages, speed electromotive forces, and impedances in the respective three-phase coils. The stored relationships are read out by the impedance calculation part 23 and the current calculation part 24.

Furthermore, the relationships of equations (1) through (3) can be determined from the known circuit equations for a three-phase brushless motor shown in the following equations (4) and (5).

$$Iu + Iv + Iw = 0 \quad (4)$$

$$\begin{bmatrix} Vu \\ Vv \\ Vw \end{bmatrix} = \begin{bmatrix} R+PL & -PM/2 & -PM/2 \\ -PM/2 & R+PL & -PM/2 \\ -PM/2 & -PM/2 & R+PL \end{bmatrix} \begin{bmatrix} Iu \\ Iv \\ Iw \end{bmatrix} + \begin{bmatrix} Eu \\ Ev \\ Ew \end{bmatrix} \quad (5)$$

In the equation (5), Vu is the terminal voltage of the U-phase coil, Vv is the terminal voltage of the V-phase coil, Vw is the terminal voltage of the W-phase coil, Eu is the speed electromotive force induced in the U-phase coil, Ev is the speed electromotive force induced in the V-phase coil, Ew is the speed electromotive force induced in the W-phase coil, Zu is the impedance of the U-phase coil, Zv is the impedance of the V-phase coil, Zw is the impedance of the W-phase coil, R is the winding resistance of the respective three-phase coils, L is the self-inductance of the respective three-phase coils, M is the mutual inductance between each of the U-phase coil and V-phase coil, U-phase coil and W-phase coil, and V-phase coil and W-phase coil, P is the time differential operator, and R+P (L+M/2) corresponds to the impedances Zu, Zv, Zw of the respective three-phase coils.

The impedance calculation part 23 determines the impedance Zu of the U-phase coil in time series via a calculation based on the relationship expressed by the stored equation (1), the terminal voltage Vu, the speed electromotive force Eu, and the detected phase current Iu of the U-phase coil when the duty cycle of the PWM control signal inputted to the gate of the lower arm FET 13u2 of the U-phase is in the current detection permission region, determines the impedance Zv of the V-phase coil in time series via a calculation based on the relationship expressed by the stored equation (2), the terminal voltage Vv, the speed electromotive force Ev, and the detected phase current Iv of the V-phase coil when the duty cycle of the PWM control signal inputted to the gate of the lower arm FET 13v2 of the V-phase is in the current detection permission region, and determines the impedance Zw of the W-phase coil in time series via a calculation based on the relationship expressed by the stored equation (3), the terminal voltage Vw, the speed electromotive force Ew, and the detected phase current Iw of the W-phase coil when the duty cycle of the PWM control signal inputted to the gate of the lower arm FET 13w2 of the W-phase is in the current detection permission region.

The storage part 22 stores the latest impedances Zu, Zv, Zw determined by the impedance calculation part 23. The stored impedances Zu, Zv, Zw are read out by the current calculation part 24.

The current calculation part 24 determines the phase current Iu of the U-phase coil in time series via a calculation based on the relationship expressed by the stored equation (1), the terminal voltage Vu, the speed electromotive force Eu, and the stored latest impedance Zu of the U-phase coil, determines the phase current Iv of the V-phase coil in time series via a calculation based on the relationship expressed by the stored equation (2), the terminal voltage Vv, the speed electromotive force Ev, and the stored latest impedance Zv of the V-phase coil, and determines the phase current Iw of the W-phase coil in time series via a calculation based on the relationship expressed by the stored equation (3), the terminal voltage Vw, the speed electromotive force Ew, and the stored latest impedance Zw of the W-phase coil. The determined phase currents Iu, Iv, Iw are sent to the judgment part 21.

The target applied voltages Vu*, Vv*, Vw* calculated by the PI calculation parts 17u, 17v, 17w are used as the terminal voltages Vu, Vv, Vw, which are used for the calculations of the impedances Zu, Zv, Zw and the phase currents Iu, Iv, Iw in the impedance calculation part 23 and the current calculation part 24. Thus, in this embodiment, the PI calculation parts 17u, 17v, 17w function as the voltage determination parts for determining the terminal voltages of the respective three-phase coils. Furthermore, voltage sensors which directly detect the respective terminal voltages can also be provided as the voltage determination part for determining the terminal voltages of the respective three-phase coils.

Each of the speed electromotive forces Eu, Ev, Ew, which are utilized for the calculation of the impedances Zu, Zv, Zw and the phase currents Iu, Iv, Iw in the impedance calculation part 23 and the current calculation part 24, is determined as a value Ke·ω, which is a product of a unit speed electromotive force Ke and a rotational speed ω of the rotor 1b determined from the change in rotation position of the rotor 1b inputted in time series from the resolver 2. Thus, in this embodiment, the impedance calculation part 23 and the current calculation part 24 function as the rotational speed determination part for determining the rotational speed ω of the motor 1, and function as the speed electromotive force determination part for determining the speed electromotive forces of the respective three-phase coils. A unit speed electromotive force Ke of this embodiment is a constant value, which is predetermined and stored in the storage part 22 and read out to the speed electromotive force determination part.

By the judgment part 21, the phase current Iu detected when the duty cycle of the PWM control signal inputted to the gate of the lower arm FET 13u2 of the U-phase is in the current detection permission region and the phase current Iu determined by the current calculation part 24 when it is not in the current detection permission region are outputted to the deviation calculation part 19u, the phase current Iv detected when the duty cycle of the PWM control signal inputted to the gate of the lower arm FET 13v2 of the V-phase is in the current detection permission region and the phase current Iv determined by the current calculation part 24 when it is not in the current detection permission region are outputted to the deviation calculation part 19v, and the phase current Iw detected when the duty cycle of the PWM control signal inputted to the gate of the lower arm FET 13w2 of the W-phase is in the current detection permission region and the phase current Iw determined by the current calculation part 24 when it is not in the current detection permission region are outputted to the deviation calculation part 19w.

Thus, when each of the duty cycles of the PWM control signals is in the current detection permission region, each of the phase currents Iu, Iv, Iw detected by the current detector 11 is fed back for calculating each of the target applied voltages Vu*, Vv*, Vw*, so that the output of the motor 1 is controlled so as to reduce the deviation between each of the target phase current Iu* and the detected phase current Iu, the target phase current Iv* and the detected phase current Iv, and the target phase current Iw* and the detected phase current Iw. While, when each of the duty cycles of the PWM control signals is not in the current detection permission region, each of the phase currents Iu, Iv, Iw determined by the current calculation part 24 is fed back for calculating each of the target applied voltages Vu*, Vv*, Vw*, so that the output of the motor 1 is controlled so as to reduce the deviation between each of the target phase current Iu* and the phase current Iu determined via a calculation, the target phase current Iv* and the phase current Iv determined via a calculation, and the target phase current Iw* and the phase current Iw determined via a calculation.

Figure 3:
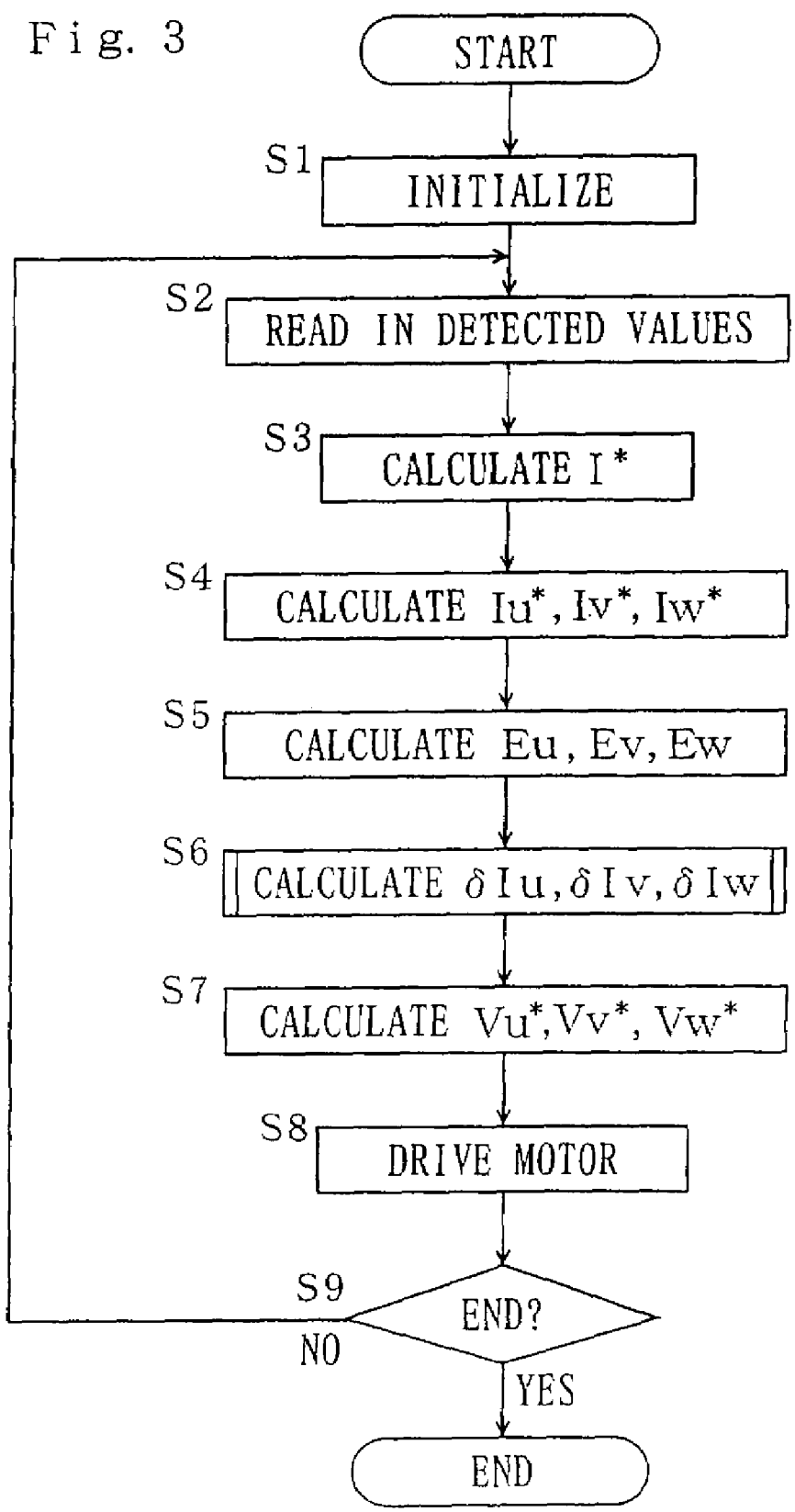
FIG. 3 is a flowchart showing control procedures by the motor controller of the first embodiment of the present invention.
Figure 4:
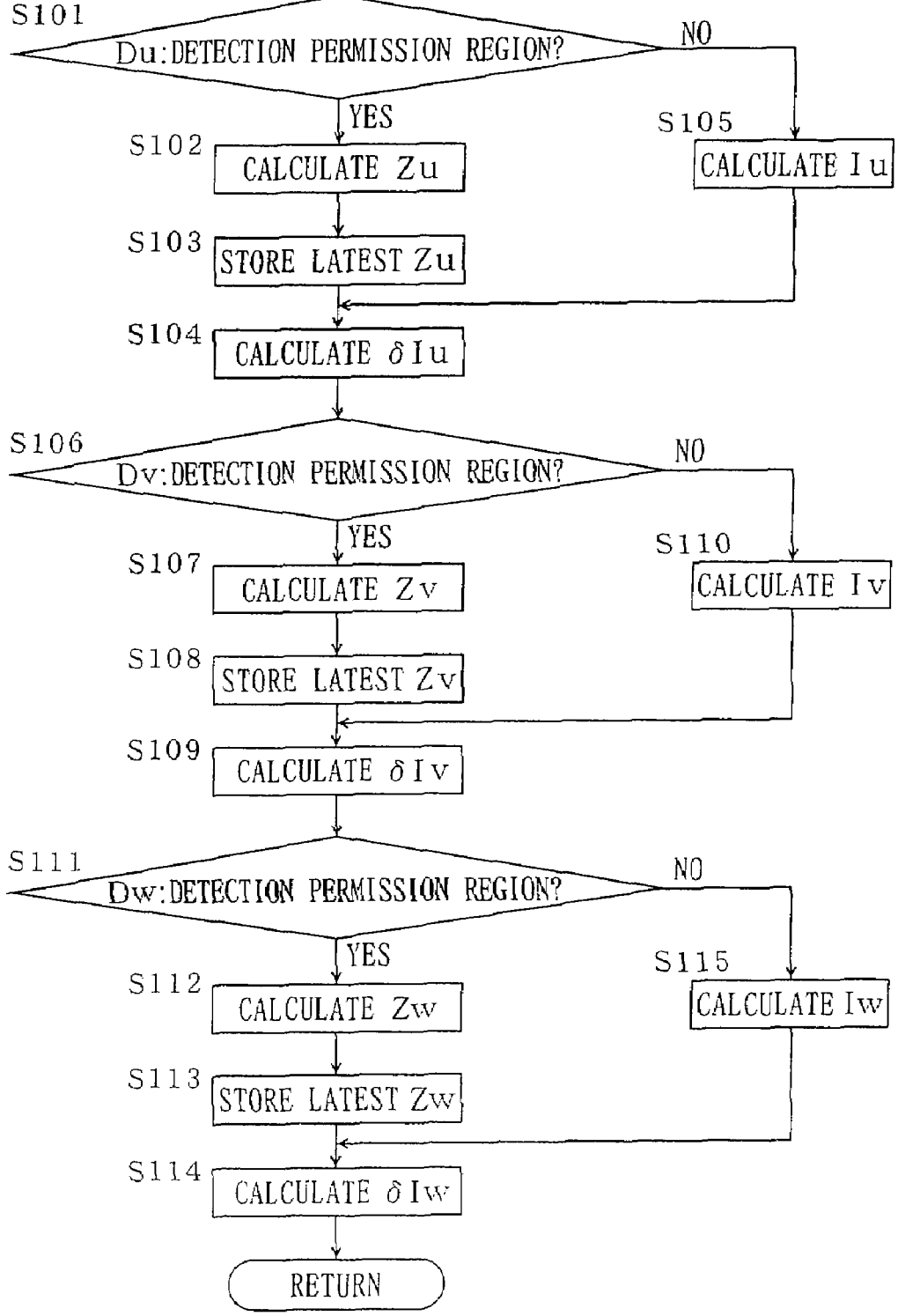
FIG. 4 is a flowchart showing control procedures by the motor controller of the first embodiment of the present invention.

The flowcharts shown in FIGS. 3 and 4 show control procedures by the controller 10 of the first embodiment.

When the control starts by, for example, turning the vehicle ignition switch ON, initialization is performed (Step S1), values detected by the respective sensors are read in (Step S2), and the basic target current I* is calculated in accordance with the steering torque and the vehicle speed (Step S3). Based on the calculated basic target current I* and the rotation position of the rotor 1b, the target phase currents Iu*, Iv*, Iw* are calculated (Step S4), and the speed electromotive forces Eu, Ev, Ew for the respective three-phase coils are calculated (Step S5).

Next, the deviations δIu, δIv, δIw between the target phase currents Iu*, Iv*, Iw* and phase currents Iu, Iv, Iw for the respective three-phase coils are calculated (Step S6).

To be more precise, as shown in FIG. 4, a judgment is made as to whether or not the duty cycle Du of the PWM control signal inputted to the gate of the lower arm FET 13u2 of the U-phase is in the current detection permission region (Step S101), and when the duty cycle Du is in the current detection permission region, the impedance Zu of the U-phase coil is calculated from the detected phase current Iu, the determined terminal voltage Vu, and the determined speed electromotive force Eu with using the equation (1) (Step S102), the most recently calculated impedance Zu is stored (Step S103), the detected phase current Iu is treated as the phase current for calculating the deviation, and the deviation δIu between the target phase current Iu* and the phase current Iu of the U-phase coil is calculated (Step S104). When the duty cycle Du is not in the current detection permission region in Step S101, the phase current Iu of the U-phase coil is calculated from the latest stored impedance Zu, the determined terminal voltage Vu, and the determined speed electromotive force Eu with using the equation (1) (Step S105), the calculated phase current Iu is treated as the phase current for calculating the deviation, and the deviation δIu between the target phase current Iu* and the calculated phase current Iu of the U-phase coil is calculated (Step S104).

Further, a judgment is made as to whether or not the duty cycle Dv of the PWM control signal inputted to the gate of the lower arm FET 13v2 of the V-phase is in the current detection permission region (Step S106), and when the duty cycle Dv is in the current detection permission region, the impedance Zv of the V-phase coil is calculated from the detected phase current Iv, the determined terminal voltage Vv, and the determined speed electromotive force Ev with using the equation (2) (Step S107), the most recently calculated impedance Zv is stored (Step S108), the detected phase current Iv is treated as the phase current for calculating the deviation, and the deviation δIv between the target phase current Iv* and the phase current Iv of the V-phase coil is calculated (Step S109). When the duty cycle Dv is not in the current detection permission region in Step S106, the phase current Iv of the V-phase coil is calculated from the latest stored impedance Zv, the determined terminal voltage Vv, and the determined speed electromotive force Ev with using the equation (2) (Step S110), the calculated phase current Iv is treated as the phase current for calculating the deviation, and the deviation δIv between the target phase current Iv* and the calculated phase current Iv of the V-phase coil is calculated (Step S109).

In addition, a judgment is made as to whether or not the duty cycle Dw of the PWM control signal inputted to the gate of the lower arm FET 13w2 of the W-phase is in the current detection permission region (Step S111), and when the duty cycle Dw is in the current detection permission region, the impedance Zw of the W-phase coil is calculated from the detected phase current Iw, the determined terminal voltage Vw, and the determined speed electromotive force Ew with using the equation (3) (Step S112), the most recently calculated impedance Zw is stored (Step S113), the detected phase current Iw is treated as the phase current for calculating the deviation, and the deviation δIw between the target phase current Iw* and the phase current Iw of the W-phase coil is calculated (Step S114). When the duty cycle Dw is not in the current detection permission region in Step S111, the phase current Iw of the W-phase coil is calculated from the latest stored impedance Zw, the determined terminal voltage Vw, and the determined speed electromotive force Ew with using the equation (3) (Step S115), the calculated phase current Iw is treated as the phase current for calculating the deviation, and the deviation 61w between the target phase current Iw* and the calculated phase current Iw of the W-phase coil is calculated (Step S114). Furthermore, initial setting values can be used as the terminal voltages Vu, Vv, Vw required for calculations at the beginning of the control.

Next, target applied voltages Vu*, Vv*, Vw* corresponding to the respective calculated deviations 61u, 61v, 61w are calculated (Step S7). The motor 1 is driven by opening and closing the respective FETs 13u1 through 13w2 in accordance with the PWM control signals such that the voltages applied to the coils of respective phases from the battery E become the target applied voltages Vu*, Vv*, Vw* (Step S8). Next, a judgment is made as to whether or not the control is to be ended by virtue of, for example, the opening/closing state of the ignition switch (Step S9), and when the control is not to be ended, processing returns to Step S2.

According to the above-mentioned embodiment, when the duty cycle of the PWM control signal is in the current detection permission region, the output of the motor 1 is controlled so as to reduce the deviations δIu, δIv, δIw between each of the target phase current Iu* and the detected phase current Iu, the target phase current Iv* and the detected phase current Iv, and the target phase current Iw* and the detected phase current Iw, and when the duty cycle of the PWM control signal is not in the current detection permission region, the output of the motor 1 is controlled so as to reduce the deviations δIu, δIv, δIw between each of the target phase current Iu* and the phase current Iu determined via a calculation, the target phase current Iv* and the phase current Iv determined via a calculation, and the target phase current Iw* and the phase current Iw determined via a calculation. Accordingly, it is not necessary to limit the duty cycle of the PWM control signal corresponding to the voltage applied to each of the coils constituting the armature winding of the motor 1, and since the duty cycle of the PWM control signal can be set at a range of, for example, 0 through 1, approximately 100% of the inverter voltage applied from the battery E can be utilized, making it possible to improve the availability of voltage and enhance motor performance. Furthermore, the respective phase currents Iu, Iv, Iw determined by the current calculation part 24 are determined based on the latest impedances among the respective impedances Zu, Zv, Zw determined in time series via calculations. Thus, even if the impedances Zu, Zv, Zw change with the lapse of time in accordance with the state of the motor, the phase currents Iu, Iv, Iw can be accurately determined by the current calculation part 24, enabling motor performance to be fully enhanced.

Figure 5:
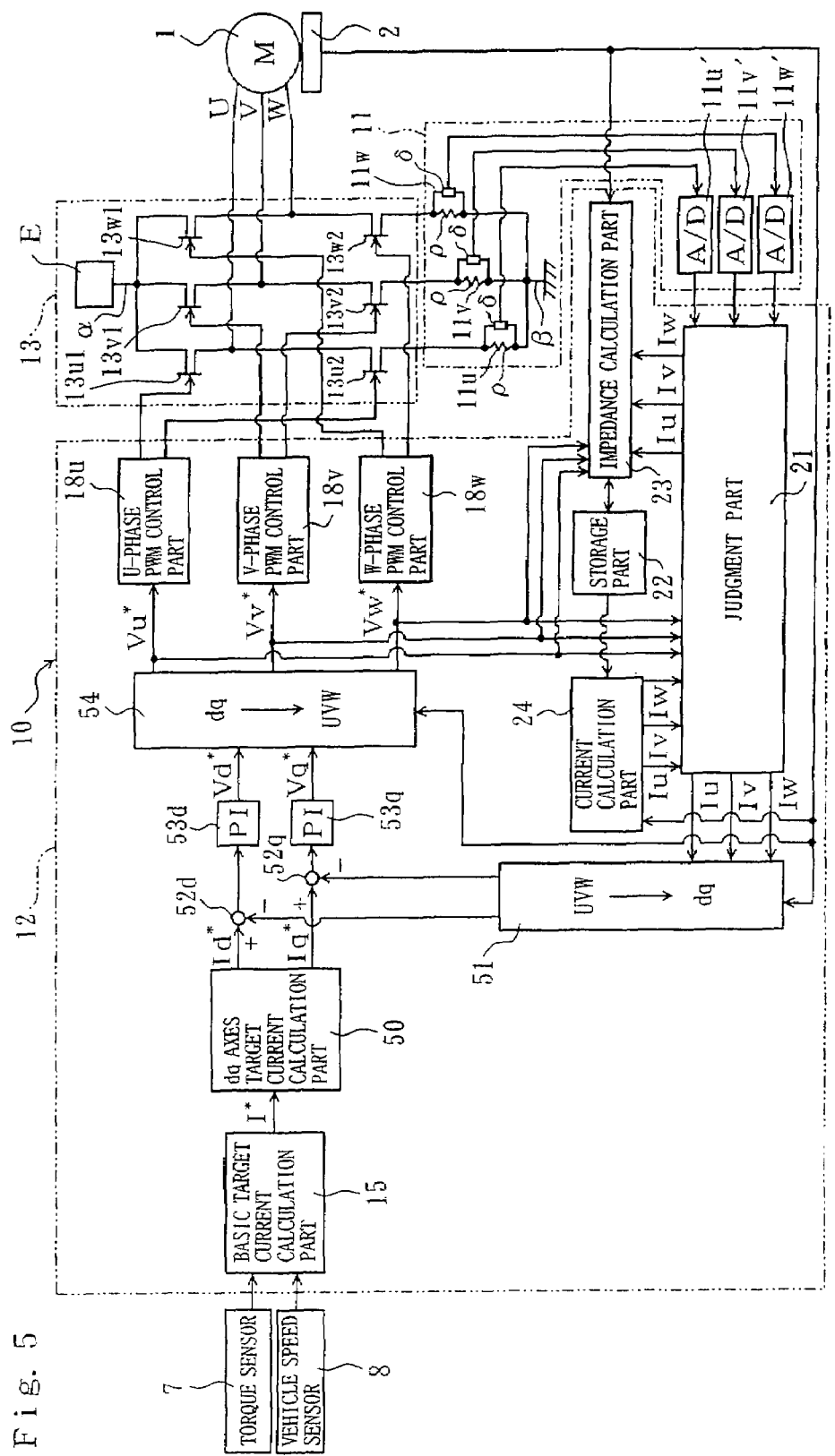
FIG. 5 illustrates the constitution of a motor controller of the second embodiment of the present invention.

FIG. 5 shows a second embodiment of the present invention. In the second embodiment, an axis, which is parallel to the direction of the magnetic flux of the field magnet (magnet 1c) of the rotor 1b, is treated as the d axis, and an axis, which is perpendicular to the d axis and the axis of rotation of the rotor 1b, is treated as the q axis, and calculations for determining the target applied voltages Vu*, Vv*, Vw* at the dq coordinate are performed based on the basic target current I*. Instead of the three-phase target current calculation part 16, respective PI calculation parts 17u, 17v, 17w, and respective deviation calculation parts 19u, 19v, 19w in the first embodiment, the second embodiment has a dq axes target current calculation part 50, a phase current coordinate converter 51, a d-axis deviation calculation part 52d, a q-axis deviation calculation part 52q, a d-axis PI calculation part 53d, a q-axis PI calculation part 53q, and a target-voltage coordinate converter 54. In this embodiment, the basic target current calculation part 15 and the dq axes target current calculation part 50 constitute the current target value calculation part.

The basic target current I* calculated by the basic target current calculation part 15 is inputted to the dq axes target current calculation part 50. The dq axes target current calculation part 50 calculates a d-axis target current Id* which generates a magnetic field in the d-axis direction, and a q-axis target current Iq* which generates a magnetic field in the q-axis direction. In this embodiment, the d-axis target current Id* and the q-axis target current Iq* are treated as the current target values. The calculation by the dq axes target current calculation part 50 can be performed with using a known arithmetic expression.

The phase currents Iu, Iv, Iw outputted from the judgment part 21 are inputted to the phase-current coordinate converter 51. The phase-current coordinate converter 51 calculates a d-axis current Id which generates a magnetic field in the d-axis direction and a q-axis current Iq which generates a magnetic field in the q-axis direction from the phase currents Iu, Iv, Iw outputted from the judgment part 21 and the rotation position of the rotor 1b detected by the resolver 2. The calculation by the phase current coordinate converter 51 can be carried out with using a known arithmetic expression.

The d-axis deviation calculation part 52d determines the deviation δId between the d-axis target current Id* and the d-axis current Id, and the d-axis PI calculation part 53d determines the d-axis target voltage Vd* by performing a PI calculation on the deviation δId. The q-axis deviation calculation part 52q determines the deviation δIq between the q-axis target current Iq* and the q-axis current Iq, and the q-axis PI calculation part 53q determines the q-axis target voltage Vq* by performing a PI calculation on the deviation δIq. In this embodiment, the d-axis current Id and the q-axis current Iq are treated as values which correspond to detected currents or values which correspond to currents determined by the current calculation part 24.

The target-voltage coordinate converter 54 calculates the target applied voltages Vu*, Vv*, Vw* to the U-phase coil, V-phase coil and W-phase coil from the d-axis target voltage Vd*, the q-axis target voltage Vq* and the rotation position of the rotor 1b detected by the resolver 2. The calculation in the target-voltage coordinate converter 54 can be performed with using a known arithmetic expression. The rest are the same as the first embodiment.

Figure 6:
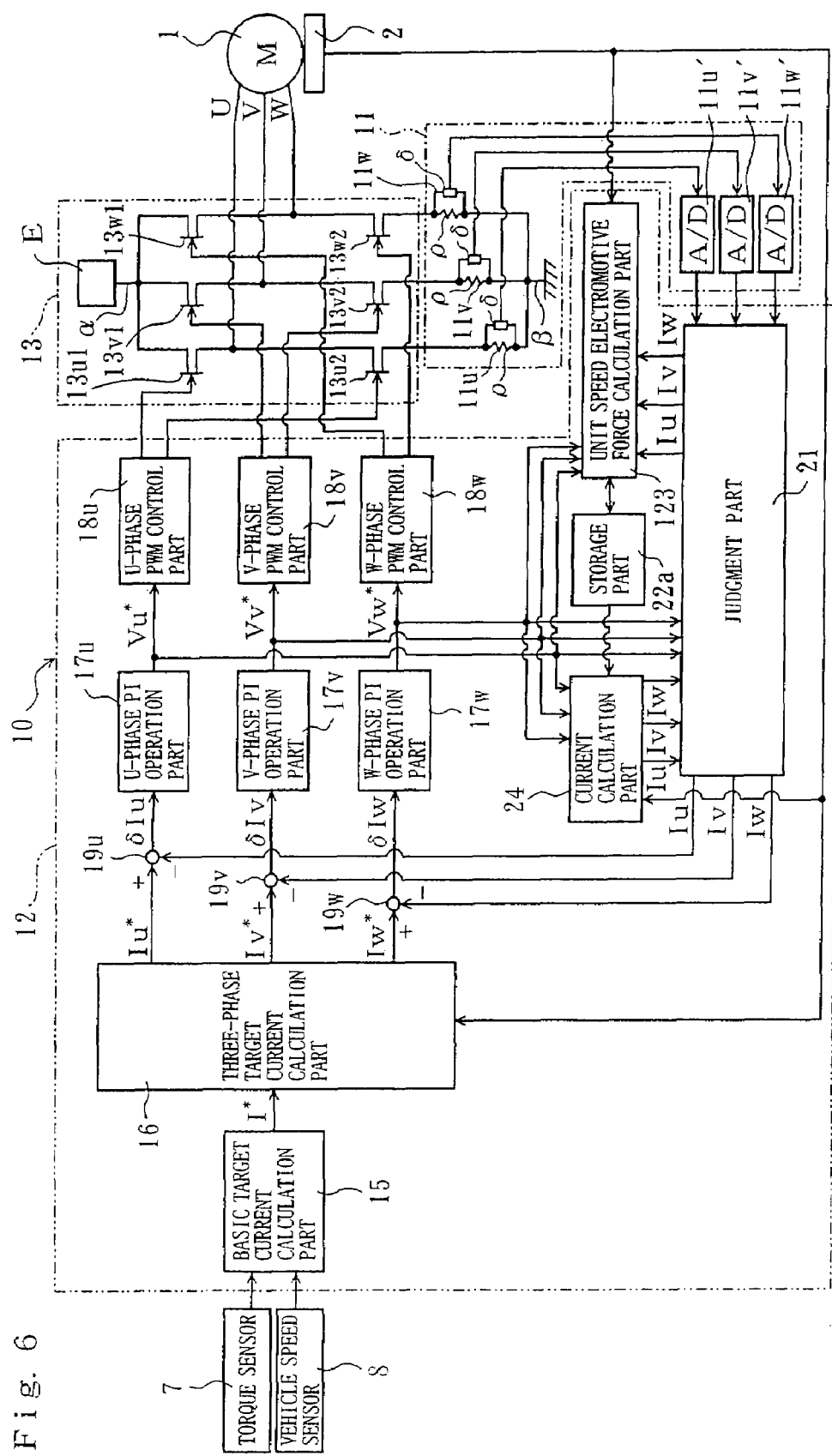
FIG. 6 illustrates the constitution a motor controller of the third embodiment of the present invention.
Figure 7:
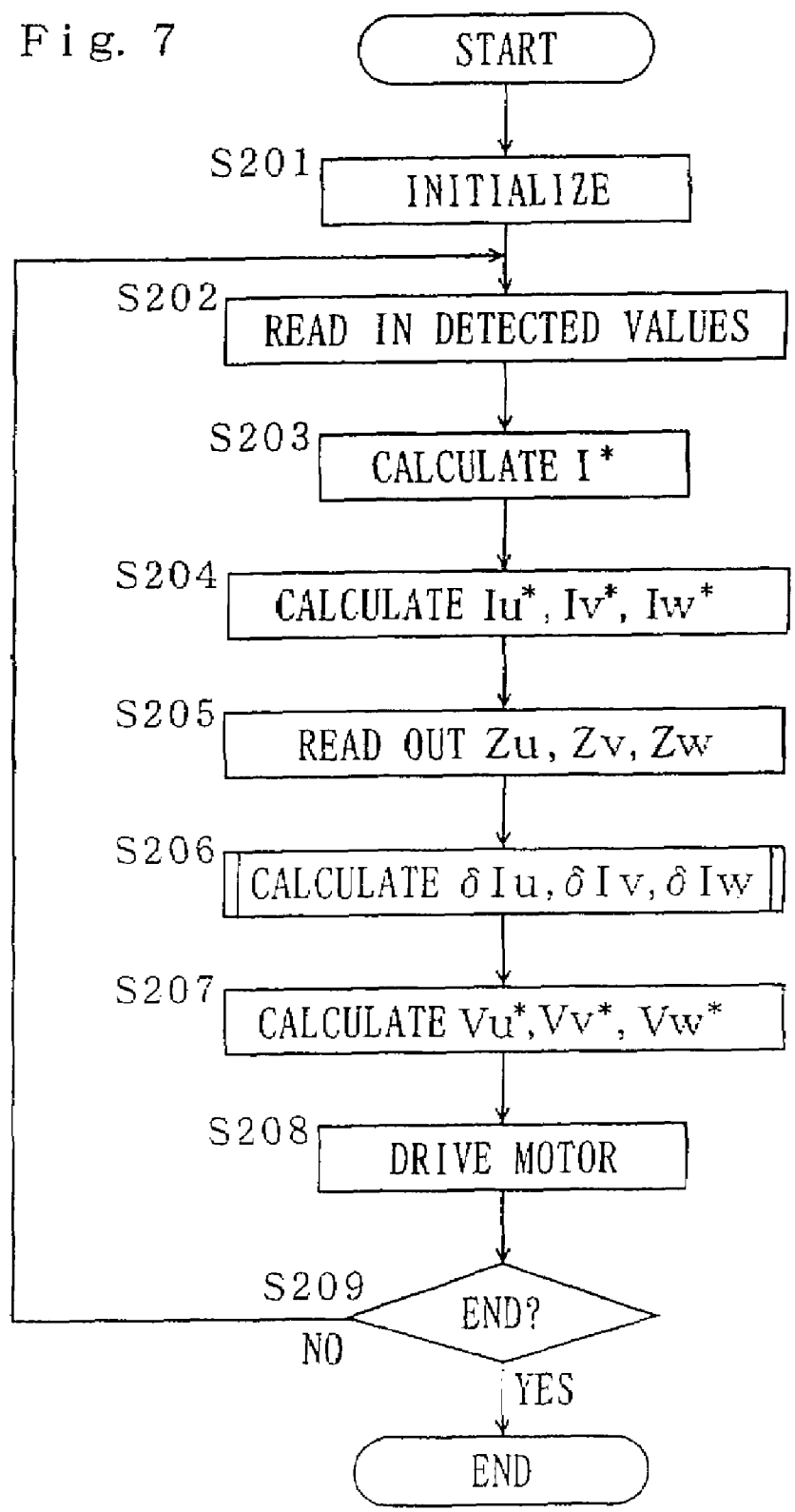
FIG. 7 is a flowchart showing control procedures by the motor controller of the third embodiment of the present invention.
Figure 8:
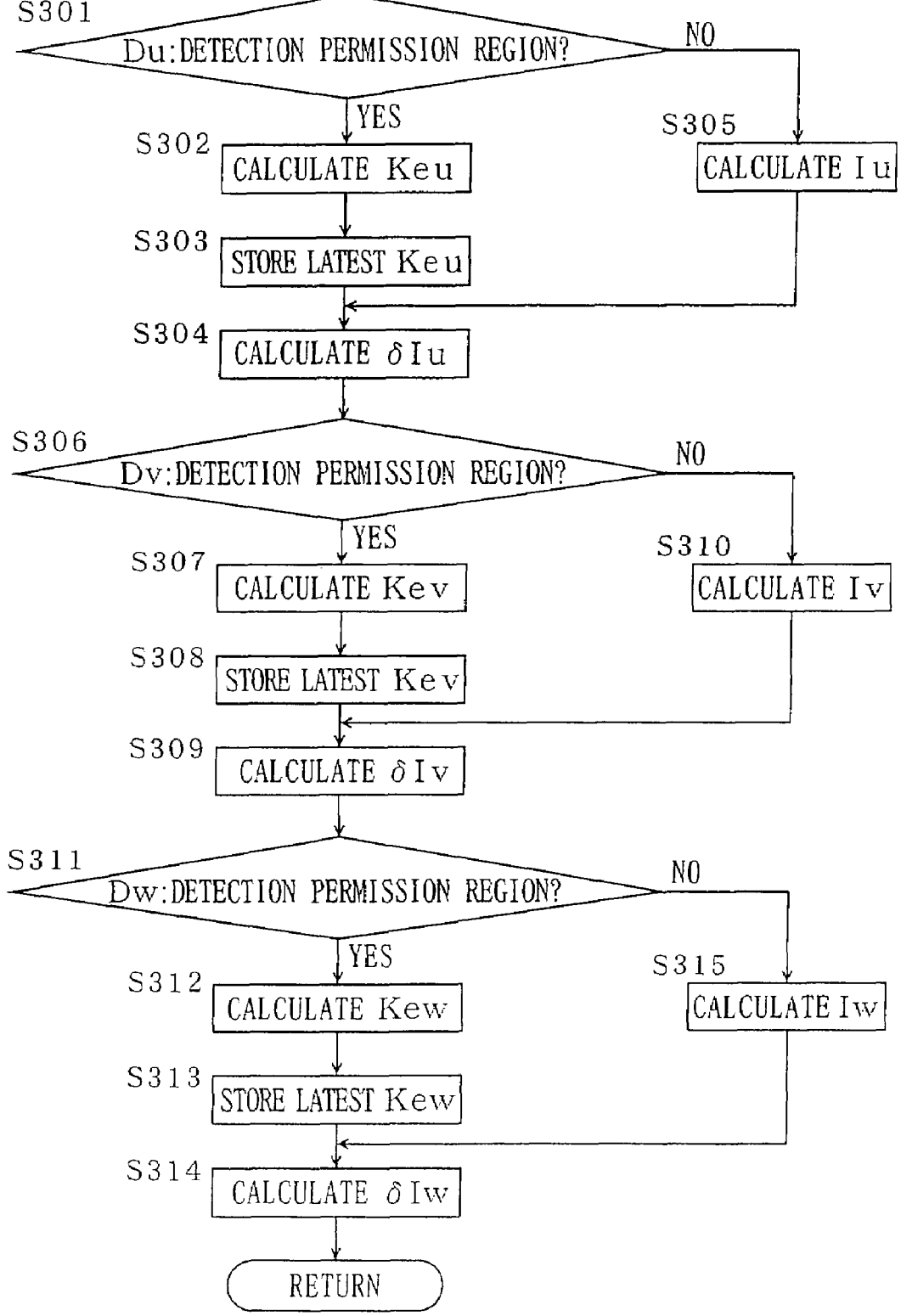
FIG. 8 is a flowchart showing control procedures by the motor controller of the third embodiment of the present invention.

FIGS. 6 through 8 show a third embodiment of the present invention. The parts which are the same as the first embodiment are indicated by the same reference numerals, and the differences are explained. Instead of the impedance calculation part 23, latest impedance storage part, and speed electromotive force determination part of the first embodiment, the controller 10 of the third embodiment has a unit speed electromotive force calculation part 123, a latest unit speed electromotive force storage part, and a set impedance storage part.

The storage part 22a of the third embodiment constitutes the relation storage part, latest unit speed electromotive force storage part, and set impedance storage part. The set impedance storage part stores impedances Zu, Zv, Zw set in advance for the three-phase coils. The impedances Zu, Zv, Zw of this embodiment are set as constant values. The relationship expressed by the equations (1) through (3) and the set impedances Zu, Zv, Zw stored in the storage part 22a are read out by the unit speed electromotive force calculation part 123, and also the relationship is read out by the current calculation part 24.

The unit speed electromotive force calculation part 123 determines the unit speed electromotive force Keu of the U-phase coil in time series via a calculation based on the relationship expressed by the stored equation (1), the terminal voltage Vu of the U-phase coil determined in the voltage determination part, the stored set impedance Zu, the rotational speed ω determined in the rotational speed determination part, and the detected phase current Iu when the duty cycle of the PWM control signal inputted to the gate of the lower arm FET 13u2 of the U-phase is in the current detection permission region, and determines the unit speed electromotive force Kev of the V-phase coil in time series via a calculation based on the relationship expressed by the stored equation (2), the terminal voltage Vv of the V-phase coil determined in the voltage determination part, the stored set impedance Zv, the determined rotational speed ω, and the detected phase current Iv when the duty cycle of the PWM control signal inputted to the gate of the lower arm FET 13v2 of the V-phase is in the current detection permission region, and furthermore, determines the unit speed electromotive force Kew of the W-phase coil in time series via a calculation based on the relationship expressed by the stored equation (3), the terminal voltage Vw of the W-phase coil determined in the voltage determination part, the stored set impedance Zw, the determined rotational speed ω, and the detected phase current Iw when the duty cycle of the PWM control signal inputted to the gate of the lower arm FET 13w2 of the W-phase is in the current detection permission region. In this embodiment, the PI calculation parts 17u, 17v, 17w can function as the voltage determination part as the same in the first embodiment, or a voltage sensor can be provided as the voltage determination part. Further, the unit speed electromotive force calculation part 123 and the current calculation part 24 function as the rotational speed determination part.

The latest unit speed electromotive forces Keu, Kev, Kew determined by the unit speed electromotive force calculation part 123 are stored in the storage part 22a, and the stored unit speed electromotive forces Keu, Kev, Kew are read out by the current calculation part 24.

The current calculation part 24 determines the phase current Iu of the U-phase coil in time series via calculations based on the relationship expressed by the stored equation (1), the terminal voltage Vu of the U-phase coil determined by the voltage determination part, the stored set impedance Zu, the determined rotational speed ω, and the stored latest unit speed electromotive force Keu, and determines the phase current Iv of the V-phase coil in time series via a calculation based on the relationship expressed by the stored equation (2), the terminal voltage Vv of the V-phase coil determined by the voltage determination part, the stored set impedance Zv, the determined rotational speed ω, and the stored latest unit speed electromotive force Kev, and furthermore, determines the phase current Iw of the W-phase coil in time series via a calculation based on the relationship expressed by the stored equation (3), the terminal voltage Vw of the W-phase coil determined by the voltage determination part, the stored set impedance Zw, the determined rotational speed ω, and the stored latest unit speed electromotive force Kew.

The flowcharts shown in FIGS. 7 and 8 show control procedures by the controller 10 of the third embodiment.

When the control starts by, for example, turning the vehicle ignition switch ON, initialization is performed (Step S201), values detected by the respective sensors are read in (Step S202), and the basic target current I* is calculated in accordance with the steering torque and vehicle speed (Step S203). Based on this calculated basic target current I* and the rotation position of the rotor 1b, the target phase currents Iu*, Iv*, Iw* are calculated (Step S204), and the set impedances Zu, Zv, Zw of the respective three-phase coils are read out (Step S205).

Next, the deviations δIu, δIv, δIw between the target phase currents Iu*, Iv*, Iw* and the phase currents Iu, Iv, Iw of the respective three-phase coils are calculated (Step S206).

To be more precise, as shown in FIG. 8, a judgment is made as to whether or not the duty cycle Du of the PWM control signal inputted to the gate of the lower arm FET 13u2 of the U-phase is in the current detection permission region (Step S301), and when the duty cycle Du is in the current detection permission region, the unit speed electromotive force Keu of the U-phase coil is calculated from the detected phase current Iu, the determined terminal voltage Vu, the stored set impedance Zu, and the determined rotational speed ω with using the equation (1) (Step S302), the latest calculated unit speed electromotive force Keu is stored (Step S303), the detected phase current Iu is treated as the phase current for calculating the deviation, and the deviation δIu between the target phase current Iu* and the phase current Iu of the U-phase coil is calculated (Step S304). When the duty cycle Du is not in the current detection permission region in Step S301, the phase current Iu of the U-phase coil is calculated from the determined terminal voltage Vu, the stored set impedance Zu, the determined rotational speed ω, and the latest stored unit speed electromotive force Keu with using the equation (1) (Step S305), the calculated phase current Iu is treated as the phase current for calculating the deviation, and the deviation δIu between the target phase current Iu* and the calculated phase current Iu of the U-phase coil is calculated (Step S304).

Further, a judgment is made as to whether or not the duty cycle Dv of the PWM control signal inputted to the gate of the lower arm FET 13v2 of the V-phase is in the current detection permission region (Step S306), and when the duty cycle Dv is in the current detection permission region, the unit speed electromotive force Kev of the V-phase coil is calculated from the detected phase current Iv, the determined terminal voltage Vv, the stored set impedance Zv, and the determined rotational speed ω with using the equation (2) (Step S307), the latest calculated unit speed electromotive force Kev is stored (Step S308), the detected phase current Iv is treated as the phase current for calculating the deviation, and the deviation δIv between the target phase current Iv* and the phase current Iv of the V-phase coil is calculated (Step S309). When the duty cycle Dv is not in the current detection permission region in Step S306, the phase current Iv of the V-phase coil is calculated from the determined terminal voltage Vv, the stored set impedance Zv, the determined rotational speed ω, and the latest stored unit speed electromotive force Kev with using the equation (2) (Step S310), the calculated phase current Iv is treated as the phase current for calculating the deviation, and the deviation δIv between the target phase current Iv* and the calculated phase current Iv of the V-phase coil is calculated (Step S309).

Furthermore, a judgment is made as to whether or not the duty cycle Dw of the PWM control signal inputted to the gate of the lower arm FET 13w2 of the W-phase is in the current detection permission region (Step S311), and when the duty cycle Dw is in the current detection permission region, the unit speed electromotive force Kew of the W-phase coil is calculated from the detected phase current Iw, the determined terminal voltage Vw, the stored set impedance Zw, and the determined rotational speed ω with using the equation (3) (Step S312), the latest calculated unit speed electromotive force Kew is stored (Step S313), the detected phase current Iw is treated as the phase current for calculating the deviation, and the deviation δIw between the target phase current Iw* and the phase current Iw of the W-phase coil is calculated (Step S314). When the duty cycle Dw is not in the current detection permission region in Step S311, the phase current Iw of the W-phase coil is calculated from the determined terminal voltage Vw, the stored set impedance Zw, the determined rotational speed ω, and the latest stored unit speed electromotive force Kew with using the equation (3) (Step S315), the calculated phase current Iw is treated as the phase current for calculating the deviation, and the deviation δIw between the target phase current Iw* and the calculated phase current Iw of the W-phase coil is calculated (Step S314). Furthermore, initial setting values can be used as the terminal voltages Vu, Vv, Vw required for calculations at the beginning of the control.

Next, target applied voltages Vu*, Vv*, Vw* corresponding to the respective calculated deviations δIu, δIv, δIw are calculated (Step S207). The motor 1 is driven by opening and closing the respective FET 13u1 through 13w2 in accordance with the PWM control signals such that the voltages applied to the coils of respective phases from the battery E become the target applied voltages Vu*, Vv*, Vw* (Step S208). Next, a judgment is made as to whether or not the control is to be ended by virtue of, for example, the opening/closing state of the ignition switch (Step S209), and when the control is not to be ended, processing returns to Step S202.

According to the third embodiment, each of the phase currents Iu, Iv, Iw determined by the current calculation part 24 is determined based on each of the speed electromotive forces Eu, Ev, Ew, each of which is a product of the determined rotational speed ω and each of the latest unit speed electromotive forces among the respective unit speed electromotive forces Keu, Kev, Kew determined in time series via calculations. Thus, even if the speed electromotive forces Eu, Ev, Ew change with the lapse of time in accordance with the state of motor 1, such as the temperature and others, the current calculation part 24 can accurately determine the phase currents Iu, Iv, Iw. The rest are the same as the first embodiment. Furthermore, according to the third embodiment combined with the first embodiment, since the speed electromotive force is 0 when, for example, the motor 1 is stayed, each of the impedances Zu, Zv, Zw can be determined when the duty cycle is in the current detection permission region; therefore the current calculation part 24 can accurately determine the phase currents Iu, Iv, Iw even if the impedances Zu, Zv, Zw change with the lapse of time in accordance with the state of the motor 1.

Furthermore, instead of the three-phase target current calculation part 16, respective PI calculation parts 17u, 17v, 17w, and respective deviation calculation parts 19u, 19v, 19w in the third embodiment, a dq axes target current calculation part 50, a phase current coordinate converter 51, a d-axis deviation calculation part 52d, a q-axis deviation calculation part 52q, a d-axis PI calculation part 53d, a q-axis PI calculation part 53q, and a target-voltage coordinate converter 54 can be provided in order to determine the target applied voltages Vu*, Vv*, Vw* from the basic target current I* at the dq coordinate as in the second embodiment.

Figure 9:
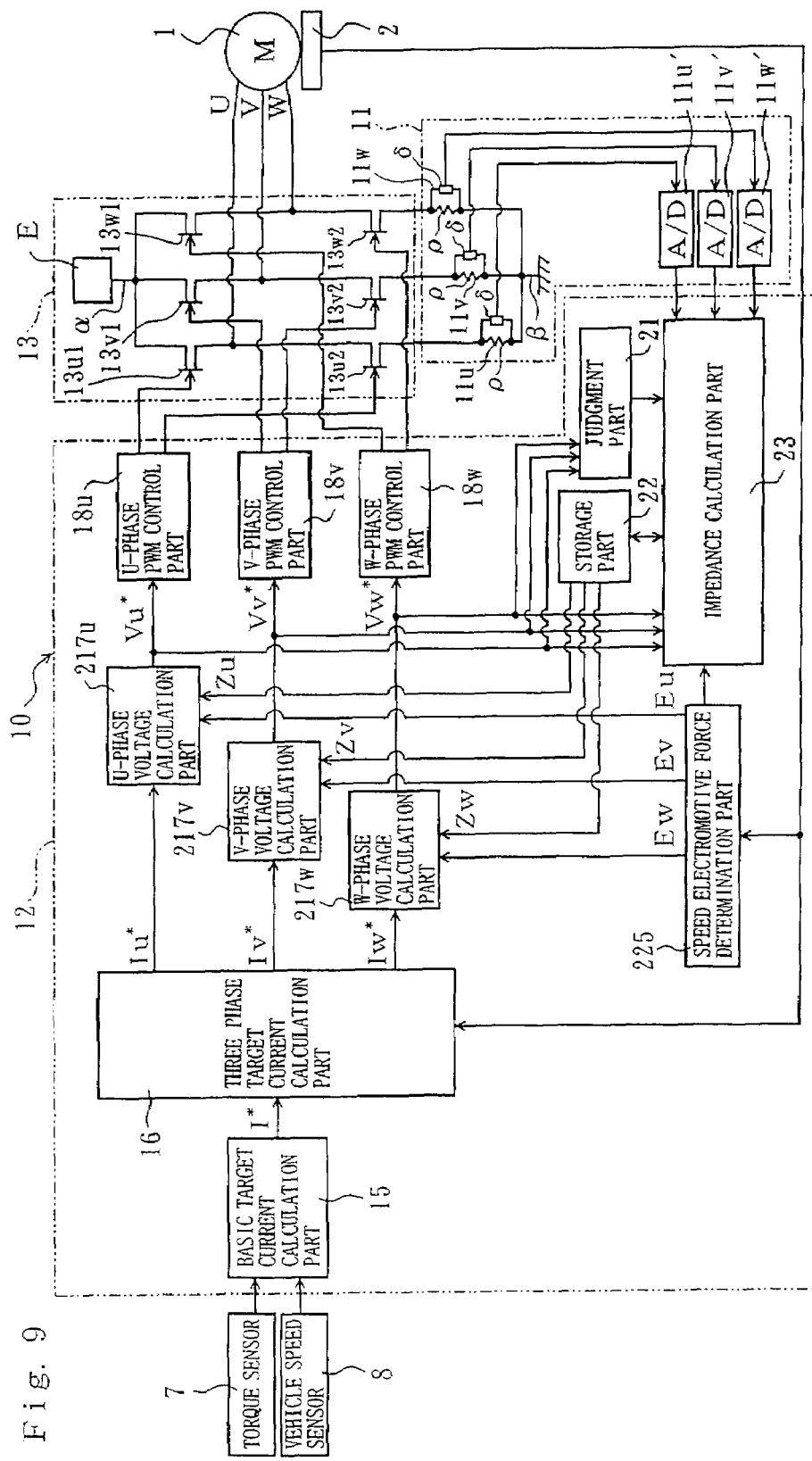
FIG. 9 illustrates the constitution of a motor controller of the fourth embodiment of the present invention.
Figure 10:
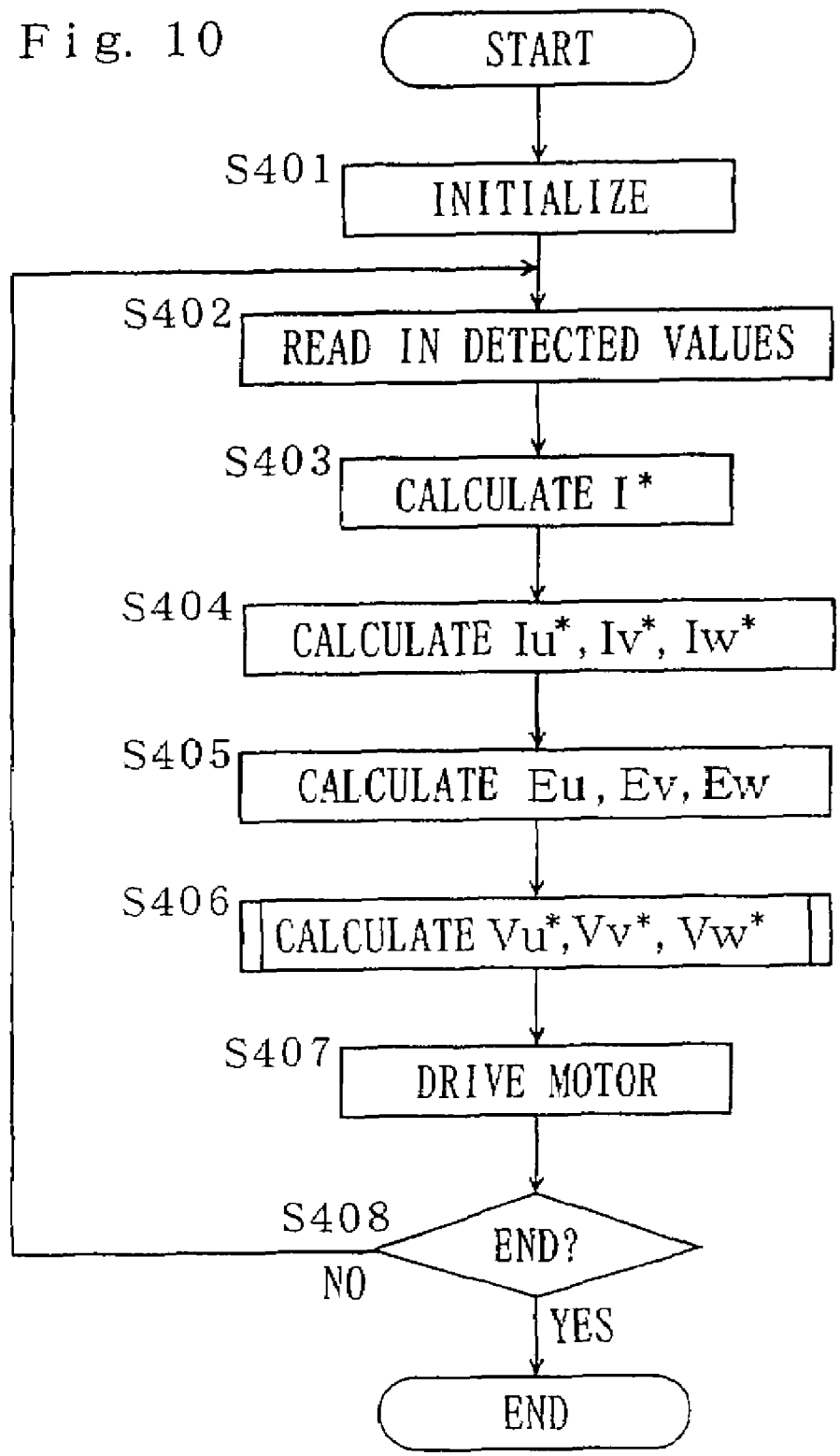
FIG. 10 is a flowchart showing control procedures by the motor controller of the fourth embodiment of the present invention.
Figure 11:
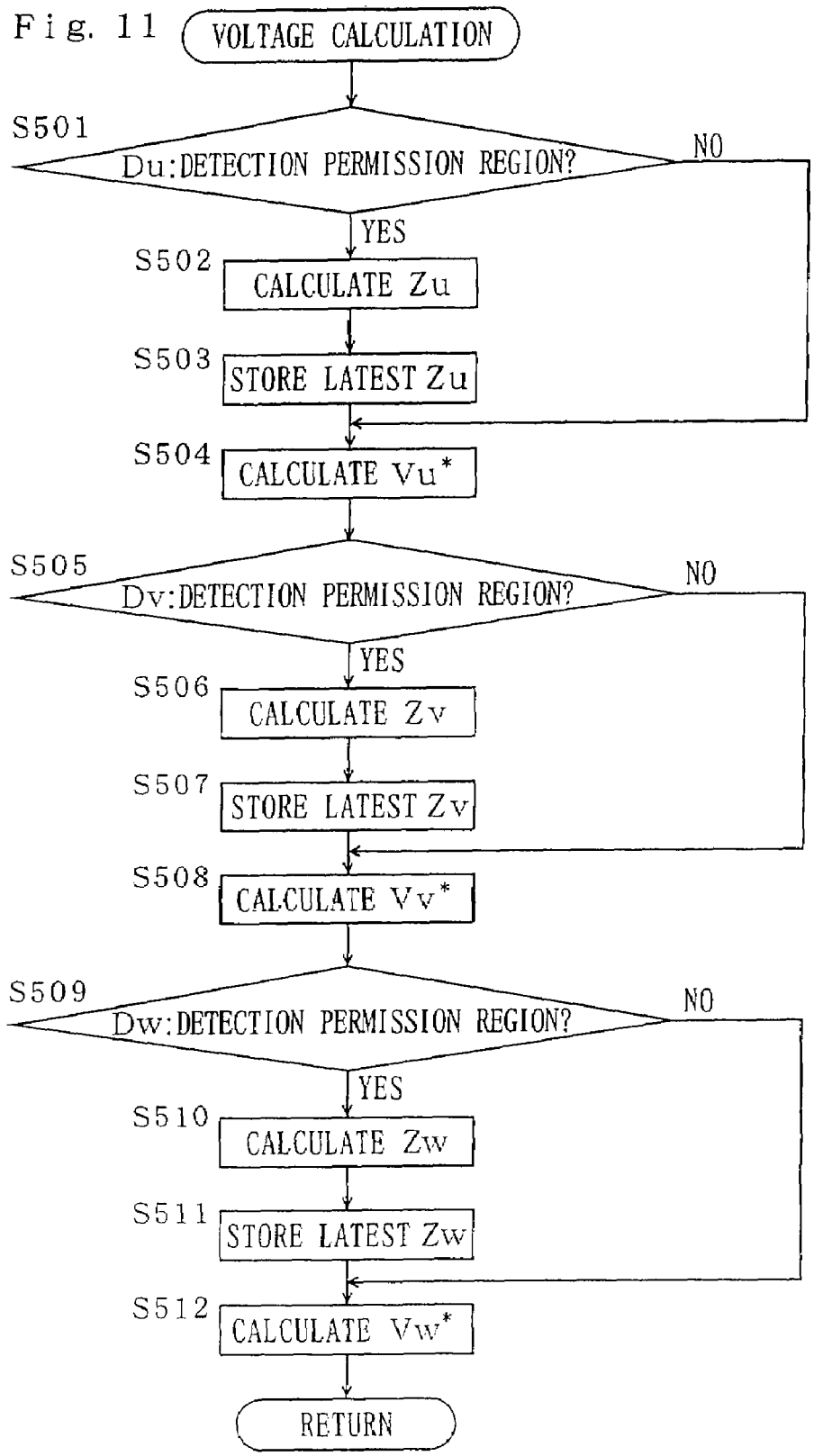
FIG. 11 is a flowchart showing control procedures by the motor controller of the fourth embodiment of the present invention.

FIGS. 9 through 11 show a fourth embodiment of the present invention. The parts which are the same as the first embodiment are indicated with the same reference numerals, and the differences are explained.

Instead of the PI calculation parts 17u, 17v, 17w, deviation calculation parts 19u, 19v, 19w, and current calculation part 24 in the first embodiment, the controller 10 of the fourth embodiment has voltage calculation parts 217u, 217v, 217w for the respective U, V, and W phases. Further, in the fourth embodiment, a speed electromotive force determination part 225 functions as the rotational speed determination part, and each of the speed electromotive forces of the respective three-phase coils is determined as a value Ke·ω, which is a product of a unit speed electromotive force Ke and a rotational speed ω of the rotor 1b determined from the change in the rotation position of the rotor 1b inputted in time series from the resolver 2. The unit speed electromotive force Ke of this embodiment is a constant value, which is predetermined and stored in the storage part 22, and is read out to the speed electromotive force determination part 225.

The respective voltage calculation parts 217u, 217v, 217w read out the relationships expressed by the equations (1) through (3) and the latest impedances Zu, Zv, Zw stored in the storage part 22, and calculate the target applied voltages Vu*, Vv*, Vw*. To be more precise, the U-phase voltage calculation part 217u determines the target applied voltage Vu* via a calculation based on the stored relationship expressed by the equation (1), the determined current target value Iu*, the determined speed electromotive force Eu, and the determined latest impedance Zu, on the assumption that the target phase current Iu* corresponds to the phase current Iu of the U-phase coil and the target applied voltage Vu* corresponds to the terminal voltage Vu of the U-phase coil. The V-phase voltage calculation part 217v determines the target applied voltage Vv* via a calculation based on the stored relationship expressed by the equation (2), the determined current target value Iv*, the determined speed electromotive force Ev, and the determined latest impedance Zv, on the assumption that the target phase current Iv* corresponds to the phase current Iv of the V-phase coil and the target applied voltage Vv* corresponds to the terminal voltage Vv of the V-phase coil. The W-phase voltage calculation part 217w determines the target applied voltage Vw* via a calculation based on the stored relationship expressed by the equation (3), the determined current target value Iw*, the determined speed electromotive force Ew, and the determined latest impedance Zw, on the assumption that the target phase current Iw* corresponds to the phase current Iw of the W-phase coil and the target applied voltage Vw* corresponds to the terminal voltage Vw of the W-phase coil.

The PWM control parts 18u, 18v, 18w generate PWM control signals each of which has a duty cycle corresponding to each of the target applied voltages Vu*, Vv*, Vw* calculated by the voltage calculation parts 217u, 217v, 217w. The output of the motor 1 is controlled such that the target applied voltages Vu*, Vv*, Vw* determined by the voltage calculation parts 217u, 217v, 217w are applied to the respective coils of the motor 1, by opening and closing the respective FET 13u1 through 13w2 of the driver 13 by the PWM control signals.

The judgment part 21 judges whether or not each of the duty cycles of the PWM control signals inputted to the gates of the lower arm FET 13u2, 13v2, 13w2 of the respective phases is in the current detection permission region. This judgment is performed by, for example, comparing each of the duty cycles, which are calculated from the target applied voltages Vu*, Vv*, Vw* calculated by the voltage calculation parts 217u, 217v, 217w, with a predetermined reference value. The judgment part 21 outputs signals corresponding to the judgment results to the impedance calculation part 23.

The impedance calculation part 23 determines the impedance Zu of the U-phase coil in time series via a calculation in response to the signal from the judgment part 21 based on the relationship expressed by the stored equation (1), the terminal voltage Vu, the determined speed electromotive force Eu, and the detected phase current Iu of the U-phase coil, when the duty cycle of the PWM control signal inputted to the gate of the lower arm FET 13u2 of the U-phase is in the current detection permission region, determines the impedance Zv of the V-phase coil in time series via a calculation in response to the signal from the judgment part 21 based on the relationship expressed by the stored equation (2), the terminal voltage Vv, the determined speed electromotive force Ev, and the detected phase current Iv of the V-phase coil, when the duty cycle of the PWM control signal inputted to the gate of the lower arm FET 13v2 of the V-phase is in the current detection permission region, and determines the impedance Zw of the W-phase coil in time series via a calculation in response to the signal from the judgment part 21 based on the relationship expressed by the stored equation (3), the terminal voltage Vw, the speed electromotive force Ew, and the detected phase current Iw of the W-phase coil, when the duty cycle of the PWM control signal inputted to the gate of the lower arm FET 13w2 of the W-phase is in the current detection permission region.

For example, the target applied voltages Vu*, Vv*, Vw* calculated by the voltage calculation parts 217u, 217v, 217w are used as the terminal voltages Vu, Vv, Vw which are used for the calculations of the impedances Zu, Zv, Zw. Thus, the voltage calculation parts 217u, 217v, 217w function as a voltage determination part for determining the terminal voltages of the respective three-phase coils. Furthermore, voltage sensors which directly detect the respective terminal voltages can also be provided as the voltage determination part for determining the terminal voltages of the respective three-phase coils.

The flowcharts shown in FIGS. 10 and 11 show control procedures by the controller 10 of the fourth embodiment.

When the control starts by, for example, turning the vehicle ignition switch ON, initialization is performed (Step S401), values detected by the respective sensors are read in (Step S402), and a basic target current I* is calculated in accordance with the steering torque and the vehicle speed (Step S403). Based on the calculated basic target current I* and the rotation position of the rotor 1b, the target phase currents Iu*, Iv*, Iw* are calculated (Step S404), and the speed electromotive forces Eu, Ev, Ew of the respective three-phase coils are calculated (Step S405).

Next, the target applied voltages Vu*, Vv*, Vw* of the respective three-phase coils are calculated (Step S406).

To be more precise, as shown in FIG. 11, a judgment is made as to whether or not the duty cycle Du of the PWM control signal inputted to the gate of the lower arm FET 13u2 of the U-phase is in the current detection permission region (Step S501), and when the duty cycle Du is in the current detection permission region, the impedance Zu of the U-phase coil is calculated from the detected phase current Iu, the determined terminal voltage Vu, and the determined speed electromotive force Eu with using the equation (1) (Step S502), and the latest calculated impedance Zu is stored (Step S503). Next, the target applied voltage Vu* of the U-phase coil is calculated (Step S504). When the duty cycle Du is not in the current detection permission region in Step S501, the target applied voltage Vu* of the U-phase coil is calculated in Step S504. Further, a judgment is made as to whether or not the duty cycle Dv of the PWM control signal inputted to the gate of the lower arm FET 13v2 of the V-phase is in the current detection permission region (Step S505), and when the duty cycle Dv is in the current detection permission region, the impedance Zv of the V-phase coil is calculated from the detected phase current Iv, the determined terminal voltage Vv, and the determined speed electromotive force Ev with using the equation (2) (Step S506), and the latest calculated impedance Zv is stored (Step S507). Next, the target applied voltage Vv* of the V-phase coil is calculated (Step S508). When the duty cycle Dv is not in the current detection permission region in Step S505, the target applied voltage Vv* of the V-phase coil is calculated in Step S508. In addition, a judgment is made as to whether or not the duty cycle Dw of the PWM control signal inputted to the gate of the lower arm FET 13w2 of the W-phase is in the current detection permission region (Step S509), and when the duty cycle Dw is in the current detection permission region, the impedance Zw of the W-phase coil is calculated from the detected phase current Iw, the determined terminal voltage Vw, and the determined speed electromotive force Ew with using the equation (3) (Step S510), and the latest calculated impedance Zw is stored (Step S511). Next, the target applied voltage Vw* of the W-phase coil is calculated (Step S512). When the duty cycle Dw is not in the current detection permission region in Step S509, the target applied voltage Vw* of the W-phase coil is calculated in Step S512. Furthermore, initial setting values can be used as the terminal voltages Vu, Vv, Vw required for calculations at the beginning of the control.

Next, the motor 1 is driven by opening and closing the respective FETs 13u1 through 13w2 in accordance with the PWM control signals such that the voltages applied to the coils of respective phases from the battery E become the target applied voltages Vu*, Vv*, Vw* (Step S407). Next, a judgment is made as to whether or not the control is to be ended by virtue of, for example, the opening/closing state of the ignition switch (Step S408), and when the control is not to be ended, processing returns to Step S402.

According to the above-mentioned embodiment, whether the duty cycle of each of the PWM control signals is in the current detection permission region or not, the target applied voltages Vu*, Vv*, Vw* for performing the open loop control of the output of the motor 1 can be determined based on the latest impedances Zu, Zv, Zw determined at the time when the duty cycle is in the current detection permission region. Accordingly, since the target applied voltages Vu*, Vv*, Vw* for performing the open loop control of the motor output can be determined regardless of the duty cycle of each of the PWM control signals, the duty cycle corresponding to each applied voltage to the coil need not to be restricted, making it possible to improve the availability of voltage.

Furthermore, the target applied voltages Vu*, Vv*, Vw* are determined based on the respective latest impedances among the respective impedances Zu, Zv, Zw determined in time series via calculations. Accordingly, even if the impedances Zu, Zv, Zw change with the lapse of time in accordance with the state of the motor 1, the target applied voltages Vu*, Vv*, Vw* can be accurately determined and the motor performance can be enhanced. The rest are the same as the first embodiment.

Figure 12:
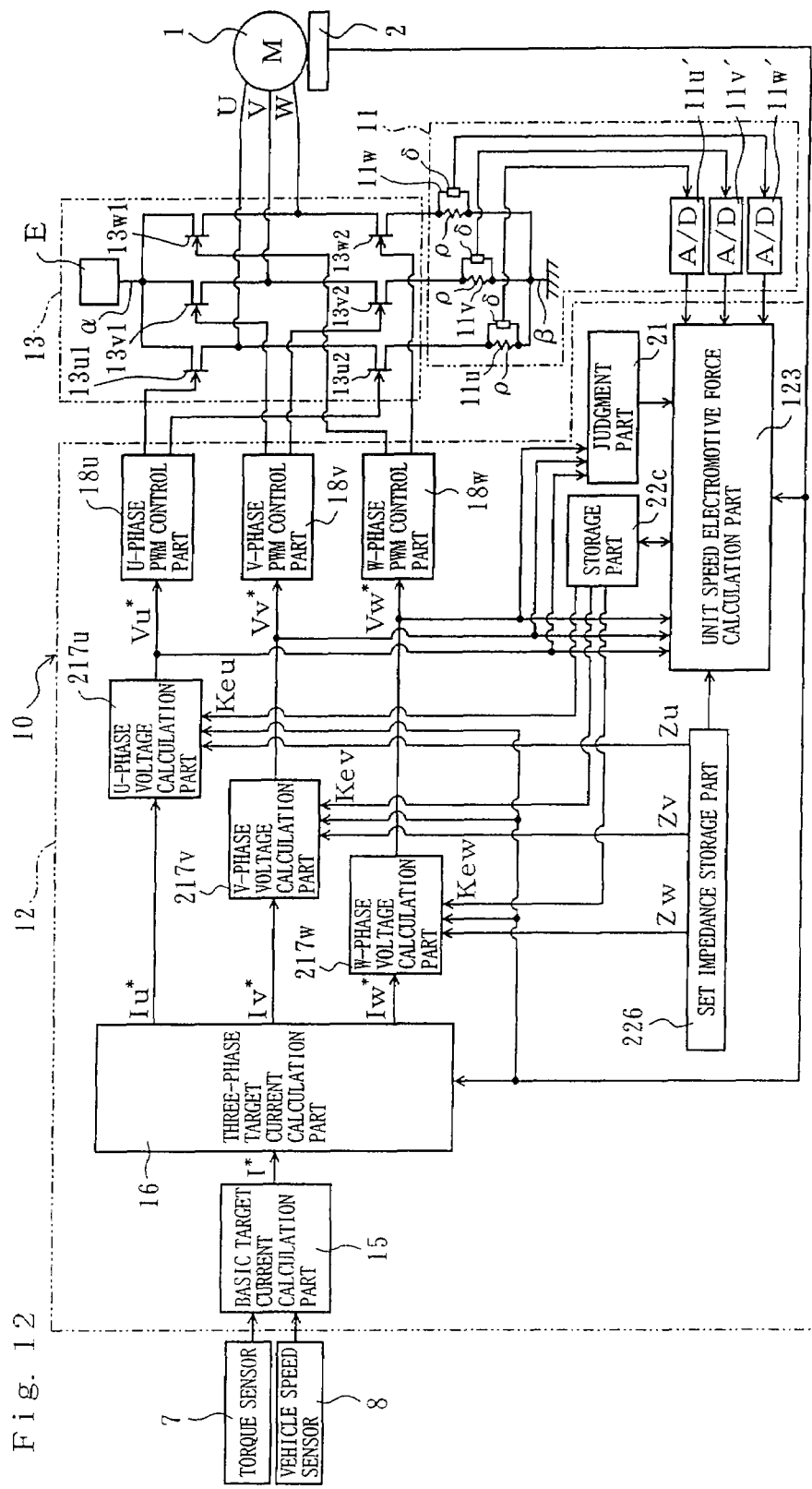
FIG. 12 illustrates the constitution of a motor controller of the fifth embodiment of the present invention.
Figure 13:
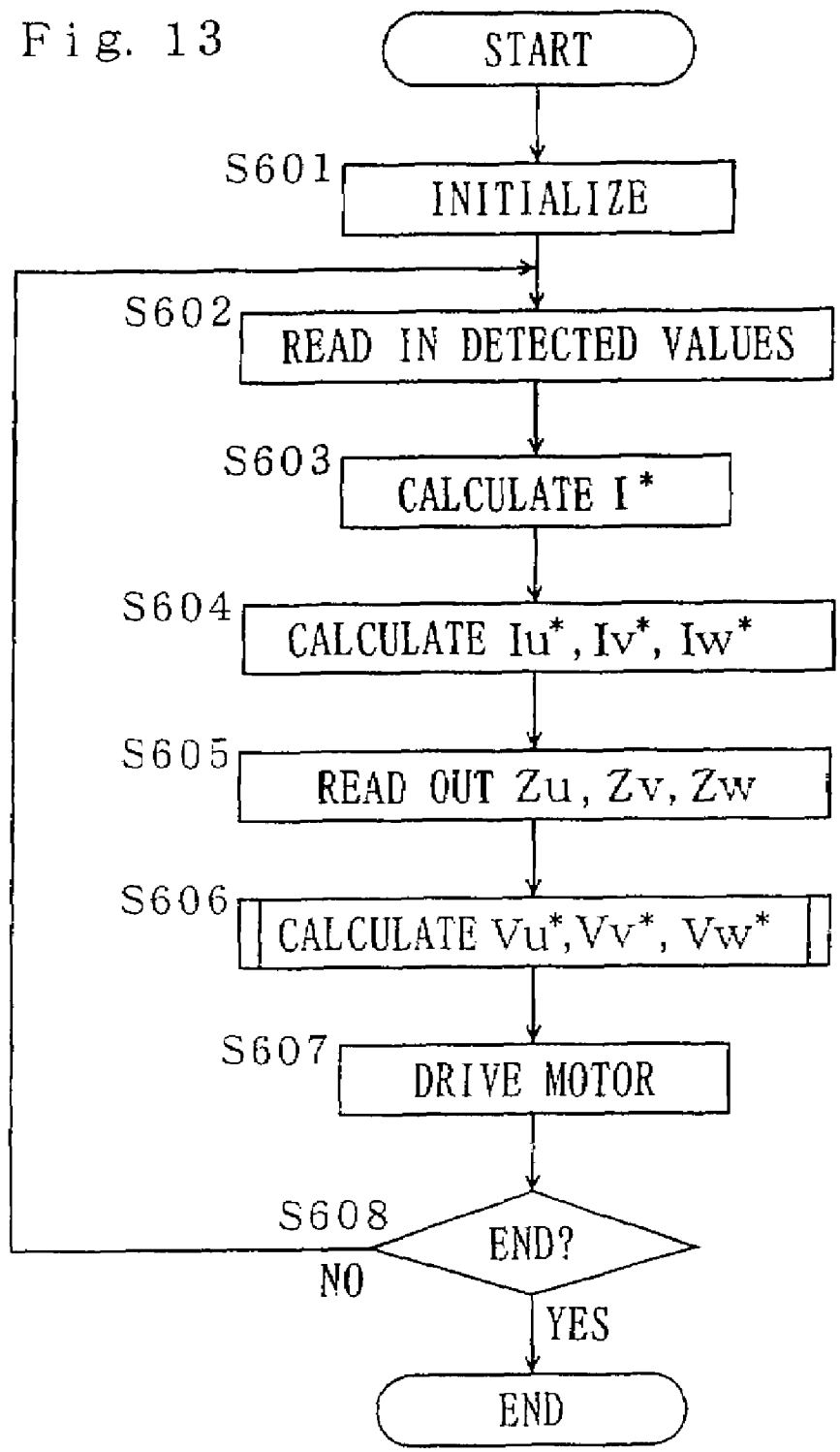
FIG. 13 is a flowchart showing control procedures by the motor controller of the fifth embodiment of the present invention.

FIGS. 12 through 14 show a fifth embodiment of the present invention. Hereinbelow, the parts which are the same as the fourth embodiment are indicated by the same reference numerals, and the differences are explained. Instead of the impedance calculation part 23, latest impedance storage part, and speed electromotive force determination part 225 in the fourth embodiment, the controller 10 of the fifth embodiment has a unit speed electromotive force calculation part 123, a latest unit speed electromotive force storage part, and a set impedance storage part 226.

The storage part 22c of the fifth embodiment constitutes the relation storage part and the latest unit speed electromotive force storage part. The set impedance storage part 226 stores impedances Zu, Zv, Zw set in advance for the respective three-phase coils. The set impedances Zu, Zv, Zw of this embodiment are treated as constant values. The relationships expressed by the equations (1) through (3) stored in the storage part 22c and the set impedances Zu, Zv, Zw stored in the set impedance storage part 226 are read out by the unit speed electromotive force calculation part 123 and the voltage calculation parts 217u, 217v, 217w. Further, in the fifth embodiment, the unit speed electromotive force calculation part 123 and the voltage calculation parts 217u, 217v, 217w function as the rotational speed determination part to determine the rotational speed ω of the rotor 1b from change in the rotation position of the rotor 1b inputted in time series from the resolver 2.

The unit speed electromotive force calculation part 123 determines the unit speed electromotive force Keu of the U-phase coil via a calculation in time series based on the relationship expressed by the stored equation (1), the terminal voltage Vu of the U-phase coil determined by the voltage determination part, the stored set impedance Zu, the rotational speed ω determined by the rotational speed determination part, and the detected phase current Iu, when the duty cycle of the PWM control signal inputted to the gate of the lower arm FET 13u2 of the U-phase is in the current detection permission region, determines the unit speed electromotive force Kev of the V-phase coil via a calculation in time series based on the relationship expressed by the stored equation (2), the terminal voltage Vv of the V-phase coil determined by the voltage determination part, the stored set impedance Zv, the determined rotational speed ω, and the detected phase current Iv, when the duty cycle of the PWM control signal inputted to the gate of the lower arm FET 13v2 of the V-phase is in the current detection permission region, and determines the unit speed electromotive force Kew of the W-phase coil via a calculation in time series based on the relationship expressed by the stored equation (3), the terminal voltage Vw of the W-phase coil determined in the voltage determination part, the stored set impedance Zw, the determined rotational speed ω, and the detected phase current Iw, when the duty cycle of the PWM control signal inputted to the gate of the lower arm FET 13w2 of the W-phase is in the current detection permission region.

The latest unit speed electromotive forces Keu, Kev, Kew determined by the unit speed electromotive force calculation part 123 are stored in the storage part 22, and the stored unit speed electromotive forces Keu, Kev, Kew are read out by the voltage calculation parts 217u, 217v, 217w.

The voltage calculation parts 217u, 217v, 217w read out the respective relationships, which are expressed by the equations (1) through (3) and stored in the storage part 22, and the respective latest unit speed electromotive forces Keu, Kev, Kew, and calculates the respective target applied voltages Vu*, Vv*, Vw*. To be more precise, the U-phase voltage calculation part 217u determines the target applied voltage Vu* via a calculation based on the stored relationship expressed by the equation (1), the determined current target value Iu*, the stored set impedance Zu, the determined rotational speed ω, and the determined latest unit speed electromotive force Keu on the assumption that the target phase current Iu* corresponds to the phase current Iu of the U-phase coil and the target applied voltage Vu* corresponds to the terminal voltage Vu of the U-phase coil. The V-phase voltage calculation part 217v determines the target applied voltage Vv* via a calculation based on the stored relationship expressed by the equation (2), the determined current target value Iv*, the stored set impedance Zv, the determined rotational speed ω, and the determined latest unit speed electromotive force Kev on the assumption that the target phase current Iv* corresponds to the phase current Iv of the V-phase coil and the target applied voltage Vv* corresponds to the terminal voltage Vv of the V-phase coil. The W-phase voltage calculation part 217w determines the target applied voltage Vw* via a calculation based on the stored relationship expressed by the equation (3), the determined current target value Iw*, the stored set impedance Zw, the determined rotational speed ω, and the determined latest unit speed electromotive force Kew on the assumption that the target phase current Iw* corresponds to the phase current Iw of the W-phase coil and the target applied voltage Vw* corresponds to the terminal voltage Vw of the W-phase coil.

The flowcharts in FIGS. 13 and 14 show control procedures by the controller 10 of the fifth embodiment.

When the control starts by, for example, turning the vehicle ignition switch ON, initialization is performed (Step S601), values detected by the respective sensors are read in (Step S602), and the basic target current I* is calculated in accordance with the steering torque and the vehicle speed (Step S603). Based on this calculated basic target current I* and the rotation position of the rotor 1b, the target phase currents Iu*, Iv*, Iw* are calculated (Step S604), and the set impedances Zu, Zv, Zw of the respective three-phase coils are read out (Step S605).

Next, the target applied voltages Vu*, Vv*, Vw* of the respective three-phase coils are calculated (Step S606).

To be more precise, as shown in FIG. 14, a judgment is made as to whether or not the duty cycle Du of the PWM control signal inputted to the gate of the lower arm FET 13u2 of the U-phase is in the current detection permission region (Step S701), and when the duty cycle Du is in the current detection permission region, the unit speed electromotive force Keu of the U-phase coil is calculated from the detected phase current Iu, the determined terminal voltage Vu, the stored set impedance Zu, and the determined rotational speed ω with using the equation (1) (Step S702), and the latest calculated unit speed electromotive force Keu is stored (Step S703). Next, the target applied voltage Vu* of the U-phase coil is calculated (Step S704). When the duty cycle Du is not in the current detection permission region in Step S701, the target applied voltage Vu* of the U-phase coil is calculated in Step S704. Further, a judgment is made as to whether or not the duty cycle Dv of the PWM control signal inputted to the gate of the lower arm FET 13v2 of the V-phase is in the current detection permission region (Step S705), and when the duty cycle Dv is in the current detection permission region, the unit speed electromotive force Kev of the V-phase coil is calculated from the detected phase current Iv, the determined terminal voltage Vv, the stored set impedance Zv, and the determined rotational speed ω with using the equation (2) (Step S706), and the latest calculated unit speed electromotive force Kev is stored (Step S707). Next, the target applied voltage Vv* of the V-phase coil is calculated (Step S708). When the duty cycle Dv is not in the current detection permission region in Step S705, the target applied voltage Vv* of the V-phase coil is calculated in Step S708. In addition, a judgment is made as to whether or not the duty cycle Dw of the PWM control signal inputted to the gate of the lower arm FET 13w2 of the W-phase is in the current detection permission region (Step S709), and when the duty cycle Dw is in the current detection permission region, the unit speed electromotive force Kew of the W-phase coil is calculated from the detected phase current Iw, the determined terminal voltage Vw, the stored set impedance Zw, and the determined rotational speed ω with using the equation (3) (Step S710), and the latest calculated unit speed electromotive force Kew is stored (Step S711). Next, the target applied voltage Vw* of the W-phase coil is calculated (Step S712). When the duty cycle Dw is not in the current detection permission region in Step S709, the target applied voltage Vw* of the W-phase coil is calculated in Step S712. Furthermore, initial setting values can be used as the terminal voltages Vu, Vv, Vw required for calculations at the beginning of the control.

Next, the motor 1 is driven by opening and closing the respective FETs 13u1 through 13w2 in accordance with the PWM control signals such that the voltages applied to the coils of respective phases from the battery E become the target applied voltages Vu*, Vv*, VW* (Step S607). Next, a judgment is made as to whether or not the control is to be ended by virtue of, for example, the opening/closing state of the ignition switch (Step S608), and when the control is not to be ended, processing returns to Step S602.

According to the above-mentioned embodiment, whether the duty cycle of each of the PWM control signals is in the current detection permission region or not, the target applied voltages Vu*, Vv*, Vw* for performing the open loop control of the output of the motor 1 can be determined based on the speed electromotive forces Eu, Ev, Ew, each of which is a product of the determined rotational speed ω and each of the latest unit speed electromotive forces Keu, Kev, Kew determined when each duty cycle is in the current detection permission region. Accordingly, since the target applied voltages Vu*, Vv*, Vw* for performing the open loop control of the motor output can be determined regardless of the duty cycle of each of the PWM control signal, the duty cycle corresponding to each applied voltage to the coil need not to be restricted, making it possible to improve the availability of voltage.

Furthermore, the target applied voltages Vu*, Vv*, Vw* are determined based on the respective speed electromotive forces Eu, Ev, Ew, each of which is a product of the determined rotational speed ω and each of the latest unit speed electromotive forces Keu, Kev, Kew determined via calculations. Accordingly, even if the speed electromotive forces Eu, Ev, Ew change with the lapse of time in accordance with the state of the motor 1, the target applied voltages Vu*, Vv*, VW* can be accurately determined, and motor performance can be enhanced. The rest are the same as the fourth embodiment. Furthermore, according to the fifth embodiment combined with the fourth embodiment, since the speed electromotive force is 0 when, for example, the motor 1 is stayed, each of the impedances Zu, Zv, Zw can be determined when the duty cycle is in the current detection permission region; therefore the voltage calculation parts 217u, 217v, 217w can accurately determine the target applied voltages Vu*, Vv*, Vw* even if the impedances Zu, Zv, Zw change with the lapse of time in accordance with the state of the motor 1.

The present invention is not limited to the above-described embodiments. For example, the application of the motor controlled by the controller of the present invention is not particularly limited. Further, the present invention can be applied to a brush motor, and the number of phases of the motor is not limited.

What is claimed is:

1. A motor controller for controlling output of a motor by opening and closing a switching element arranged on a power supply line to said motor in accordance with a PWM control signal, comprising:
    a relation storage part for storing a predetermined relationship between a current, a terminal voltage, a speed electromotive force, and an impedance of a coil constituting an armature winding of said motor;
    a voltage determination part for determining the terminal voltage of said coil;
    a speed electromotive force determination part for determining the speed electromotive force of said coil;
    a current detector for detecting the current of said coil;
    a judgment part for judging whether or not a duty cycle of said PWM control signal is in a current detection permission region by comparing said duty cycle with a set reference value;
    an impedance calculation part for determining the impedance of said coil in time series via a calculation based on the stored relationship, the determined terminal voltage, the determined speed electromotive force, and the detected current when said duty cycle of the PWM control signal is in the current detection permission region;
    a latest impedance storage part for storing the latest impedance determined by said impedance calculation part;
    a current calculation part for determining the current of said coil via a calculation based on the stored relationship, the determined terminal voltage, the determined speed electromotive force, and the stored latest impedance; and
    a current target value calculation part for determining a current target value via a calculation,
    wherein, when said duty cycle of the PWM control signal is in the current detection permission region, the output of said motor is controlled so as to reduce the deviation between the current target value determined by said current target value calculation part and a value corresponding to the detected current, and
    when said duty cycle of the PWM control signal is not in the current detection permission region, the output of said motor is controlled so as to reduce the deviation between the current target value determined by said current target value calculation part and a value corresponding to the current determined by said current calculation part.

2. The motor controller according to claim 1, wherein said motor is a three-phase brushless motor, which is feedback controlled in accordance with the respective phase currents of three-phase coils constituting the armature winding of the motor, and a relationship expressed by the following equations (1) through (3) is stored as the predetermined relationship between the current, the terminal voltage, the speed electromotive force, and the impedance of said coil, $$Iu=(Vu-Eu)/Zu \quad (1)$$

$$Iv=(Vv-Ev)/Zv \quad (2)$$

$$Iw=(Vw-Ew)/Zw \quad (3)$$

where Iu, Iv, Iw are phase currents of said respective three-phase coils, Vu, Vv, Vw are terminal voltages of said respective three-phase coils, Eu, Ev, Ew are speed electromotive forces of said respective three-phase coils, Zu, Zv, Zw are impedances of said respective three-phase coils, and the speed electromotive force is determined by multiplying the unit speed electromotive force by the rotational speed of said motor.

3. A motor controller for controlling output of a motor by opening and closing a switching element arranged on a power supply line to said motor in accordance with a PWM control signal, comprising:
    a relation storage part for storing a predetermined relationship between a current, a terminal voltage, a speed electromotive force, and an impedance of a coil constituting an armature winding of said motor;
    a voltage determination part for determining the terminal voltage of said coil;
    a set impedance storage part for storing a set impedance of said coil;
    a current detector for detecting the current of said coil;

a rotational speed determination part for determining the rotational speed of said motor;

a judgment part for judging whether or not a duty cycle of said PWM control signal is in a current detection permission region by comparing said duty cycle with a set reference value;

a unit speed electromotive force calculation part for determining a unit speed electromotive force, which is a speed electromotive force per unit rotational speed of said motor, in time series via a calculation based on the stored relationship, the determined terminal voltage, the stored impedance, the determined rotational speed, and the detected current, when said duty cycle of the PWM control signal is in the current detection permission region;

a latest unit speed electromotive force storage part for storing the latest unit speed electromotive force determined by said unit speed electromotive force calculation part;

a current calculation part for determining the current of said coil via a calculation based on the stored relationship, the determined terminal voltage, the stored impedance, the determined rotational speed, and the stored latest unit speed electromotive force; and a current target value calculation part for determining a current target value via a calculation, wherein, when said duty cycle of the PWM control signal is in the current detection permission region, the output of said motor is controlled so as to reduce the deviation between the current target value determined by said current target value calculation part and a value corresponding to the detected current, and when said duty cycle of the PWM control signal is not in the current detection permission region, the output of said motor is controlled so as to reduce the deviation between the current target value determined by said current target value calculation part and a value corresponding to the current determined by said current calculation part.

4. The motor controller according to claim 3, wherein said motor is a three-phase brushless motor, which is feedback controlled in accordance with the respective phase currents of three-phase coils constituting the armature winding of the motor, and a relationship expressed by the following equations (1) through (3) is stored as the predetermined relationship between the current, the terminal voltage, the speed electromotive force, and the impedance of said coil, $$Iu=(Vu-Eu)/Zu \tag{1}$$

$$Iv=(Vv-Ev)/Zv \tag{2}$$

$$Iw=(Vw-Ew)/Zw \tag{3}$$

where Iu, Iv, Iw are phase currents of said respective three-phase coils, Vu, Vv, Vw are terminal voltages of said respective three-phase coils, Eu, Ev, Ew are speed electromotive forces of said respective three-phase coils, Zu, Zv, Zw are impedances of said respective three-phase coils, and the speed electromotive force is determined by multiplying the unit speed electromotive force by the rotational speed of said motor.

5. A motor controller for controlling output of a motor by opening and closing a switching element arranged on a power supply line to said motor in accordance with a PWM control signal, comprising:

a relation storage part for storing a predetermined relationship between a current, a terminal voltage, a speed electromotive force, and an impedance of a coil constituting an armature winding of said motor;

a voltage determination part for determining the terminal voltage of said coil;

a speed electromotive force determination part for determining the speed electromotive force of said coil;

a current detector for detecting the current of said coil;

a judgment part for judging whether or not a duty cycle of said PWM control signal is in a current detection permission region by comparing said duty cycle with a set reference value;

an impedance calculation part for determining the impedance of said coil in time series via a calculation based on the stored relationship, the determined terminal voltage, the determined speed electromotive force, and the detected current, when said duty cycle of the PWM control signal is in the current detection permission region;

a latest impedance storage part for storing the latest impedance determined by said impedance calculation part;

a current target value calculation part for determining a current target value via a calculation; and a voltage calculation part for determining a target applied voltage via a calculation based on the stored relationship, the determined current target value, the determined speed electromotive force, and the determined latest impedance, on the assumption that the current target value corresponds to the current of said coil and the target applied voltage corresponds to the terminal voltage of said coil, wherein the output of said motor is controlled such that the target applied voltage determined by said voltage calculation part is applied to said coil.

6. The motor controller according to claim 5, wherein said motor is a three-phase brushless motor, which is feedback controlled in accordance with the respective phase currents of three-phase coils constituting the armature winding of the motor, and a relationship expressed by the following equations (1) through (3) is stored as the predetermined relationship between the current, the terminal voltage, the speed electromotive force, and the impedance of said coil, $$Iu=(Vu-Eu)/Zu \tag{1}$$

$$Iv=(Vv-Ev)/Zv \tag{2}$$

$$Iw=(Vw-Ew)/Zw \tag{3}$$

where Iu, Iv, Iw are phase currents of said respective three-phase coils, Vu, Vv, Vw are terminal voltages of said respective three-phase coils, Eu, Ev, Ew are speed electromotive forces of said respective three-phase coils, Zu, Zv, Zw are impedances of said respective three-phase coils, and the speed electromotive force is determined by multiplying the unit speed electromotive force by the rotational speed of said motor.

7. A motor controller for controlling output of a motor by opening and closing a switching element arranged on a power supply line to said motor in accordance with a PWM control signal, comprising:

a relation storage part for storing a predetermined relationship between a current, a terminal voltage, a speed electromotive force, and an impedance of a coil constituting an armature winding of said motor;

a voltage determination part for determining the terminal voltage of said coil;

a set impedance storage part for storing a set impedance of said coil;

a current detector for detecting the current of said coil;

a rotational speed determination part for determining the rotational speed of said motor;

a judgment part for judging whether or not a duty cycle of said PWM control signal is in a current detection permission region by comparing said duty cycle with a set reference value;

a unit speed electromotive force calculation part for determining a unit speed electromotive force, which is a speed electromotive force per unit rotational speed of said motor, in time series via a calculation based on the stored relationship, the determined terminal voltage, the stored impedance, the determined rotational speed, and the detected current when said duty cycle of the PWM control signal is in the current detection permission region;

a latest unit speed electromotive force storage part for storing the latest unit speed electromotive force determined by said unit speed electromotive force calculation part;

a current target value calculation part for determining a current target value via a calculation; and a voltage calculation part for determining a target applied voltage to said coil via a calculation based on the stored relationship, the determined current target value, the stored impedance, the determined rotational speed, and the determined latest unit speed electromotive force, on the assumption that the current target value corresponds to the current of said coil and the target applied voltage corresponds to the terminal voltage of said coil, wherein the output of said motor is controlled such that the target applied voltage determined by said voltage calculation part is applied to said coil. speed of said motor.

8. The motor controller according to claim 7, wherein said motor is a three-phase brushless motor, which is feedback controlled in accordance with the respective phase currents of three-phase coils constituting the armature winding of the motor, and a relationship expressed by the following equations (1) through (3) is stored as the predetermined relationship between the current, the terminal voltage, the speed electromotive force, and the impedance of said coil, $$Iu = (Vu - Eu)/Zu \quad (1)$$

$$Iv = (Vv - Ev)/Zv \quad (2)$$

$$Iw = (Vw - Ew)/Zw \quad (3)$$

where Iu, Iv, Iw are phase currents of said respective three-phase coils, Vu, Vv, Vw are terminal voltages of said respective three-phase coils, Eu, Ev, Ew are speed electromotive forces of said respective three-phase coils, Zu, Zv, Zw are impedances of said respective three-phase coils, and the speed electromotive force is determined by multiplying the unit speed electromotive force by the rotational speed of said motor.

* * * * *